US009065497B2

(12) United States Patent
Swope et al.

(10) Patent No.: US 9,065,497 B2
(45) Date of Patent: Jun. 23, 2015

(54) CONTEXT AWARE MULTIPLE-INPUT AND MULTIPLE-OUTPUT ANTENNA SYSTEMS AND METHODS

(71) Applicant: Symbol Technologies, Inc., Lincolnshire, IL (US)

(72) Inventors: Charles B Swope, Coral Springs, FL (US); Durgesh Tiwari, Wheatley Heights, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 183 days.

(21) Appl. No.: 13/937,667

(22) Filed: Jul. 9, 2013

(65) Prior Publication Data
US 2015/0016555 A1 Jan. 15, 2015

(51) Int. Cl.
*H04B 7/04* (2006.01)
*H04B 17/00* (2015.01)
*H04B 7/02* (2006.01)
*H04B 7/06* (2006.01)

(52) U.S. Cl.
CPC .............. *H04B 7/0413* (2013.01); *H04B 17/00* (2013.01); *H04B 7/024* (2013.01); *H04B 7/0691* (2013.01)

(58) Field of Classification Search
CPC ............... H04B 17/00; H04B 17/0002; H04B 17/0017; H04B 7/0413; H04B 7/00; H04B 7/02; H04B 7/024; H04B 7/0447; H04B 7/0691; H04B 7/08; H04B 7/0802
See application file for complete search history.

(56) References Cited

U.S. PATENT DOCUMENTS

| 5,117,236 A | 5/1992 | Chang et al. |
| 6,735,524 B1 | 5/2004 | Challoner et al. |
| 6,885,847 B1 * | 4/2005 | Lumelsky ............. 455/41.2 |
| 7,439,909 B2 | 10/2008 | Van Toorenburg |
| 7,453,363 B2 | 11/2008 | Reynolds |
| 7,792,640 B2 | 9/2010 | Swope et al. |
| 8,159,399 B2 | 4/2012 | Dorsey et al. |
| 8,320,932 B2 | 11/2012 | Pinder et al. |

(Continued)

FOREIGN PATENT DOCUMENTS

| CA | 2485097 A1 | 11/2003 |
| EP | 2544302 A1 | 1/2013 |

(Continued)

OTHER PUBLICATIONS

International Search Report and Written Opinion dated Sep. 16, 2014 in counterpart application PCT/US2014/044022.

*Primary Examiner* — Anh Ngoc Nguyen

(57) ABSTRACT

A method, a system, and a server provide context aware multiple-input-multiple-output MIMO antenna systems and methods. Specifically, the systems and methods provide, in a multiple MIMO antenna or node system, techniques of antenna/beam selection, calibration, and periodic refresh, based on environmental and mission context. The systems and methods can define a context vector as built by cooperative use of the nodes on the backhaul to direct antennas for the best user experience as well as mechanisms using the context vector in a 3D employment to point the antennas in a cooperative basis therebetween. The systems and methods utilize sensors in the nodes to provide tailored context sensing versus motion sensing, in conjunction with BER (Bit Error Rate) measurements on test signals to position an antenna beam from a selection of several "independent" antenna subsystems operating within a single node, as well as, that of its optically connected neighbor.

20 Claims, 18 Drawing Sheets

(56) References Cited

U.S. PATENT DOCUMENTS

| | | |
|---|---|---|
| 8,351,546 B2 | 1/2013 | Vitek |
| 8,396,483 B2 | 3/2013 | Chater-Lea et al. |
| 2006/0152410 A1 | 7/2006 | Shi |
| 2006/0276227 A1 | 12/2006 | Dravida |
| 2007/0057843 A1 | 3/2007 | Chang et al. |
| 2010/0330940 A1 | 12/2010 | Sheynblat et al. |
| 2011/0070840 A1 | 3/2011 | Nielsen et al. |
| 2011/0274183 A1* | 11/2011 | Wang .................... 375/259 |
| 2012/0056784 A1 | 3/2012 | Xie et al. |
| 2012/0169539 A1 | 7/2012 | Huang et al. |
| 2013/0040655 A1 | 2/2013 | Keidar |
| 2013/0101005 A1* | 4/2013 | Aryanfar .................. 375/224 |

FOREIGN PATENT DOCUMENTS

| | | |
|---|---|---|
| GB | 2480485 A | 11/2011 |
| WO | 20050015755 A2 | 2/2005 |
| WO | 2008127750 A2 | 10/2008 |
| WO | 2013028171 A1 | 2/2013 |

\* cited by examiner

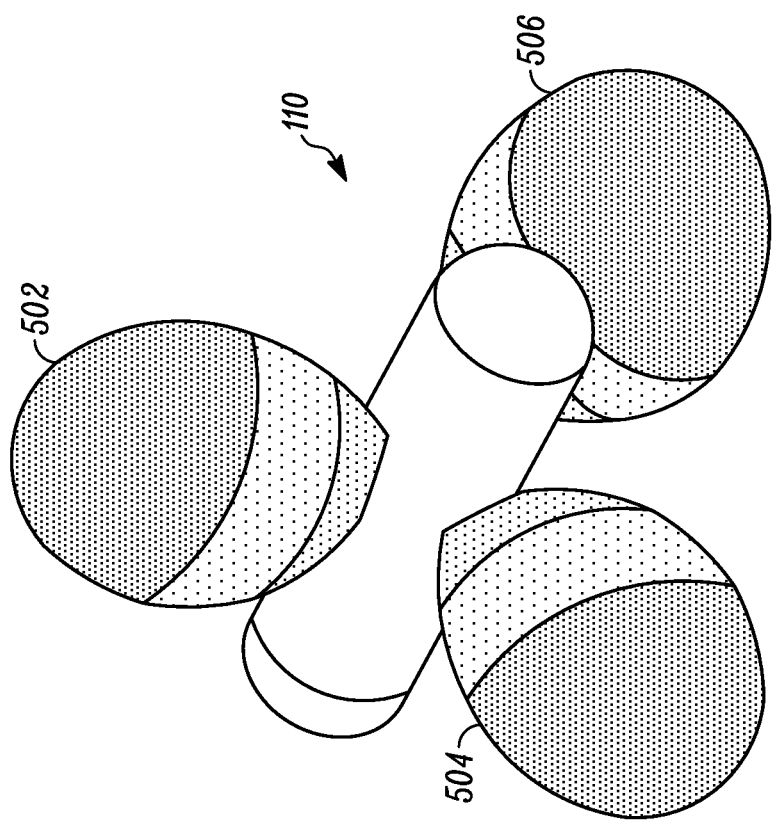
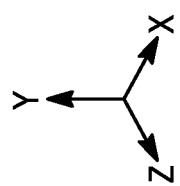
FIG. 5

CONTEXT AWARE MULTIPLE-INPUT AND MULTIPLE-OUTPUT ANTENNA SYSTEMS AND METHODS

BACKGROUND OF THE INVENTION

In wireless systems and methods, an exemplary antenna configuration includes a multiple-input and multiple-output (MIMO) antennas which use multiple antennas at both a transmitter and a receiver to improve communication performance. MIMO is an important part of wireless communication standards and systems such as IEEE 802.11n (Wi-Fi), 4G, 3GPP Long Term Evolution (LTE), Worldwide Interoperability for Microwave Access (WiMAX), Evolved High-Speed Packet Access (HSPA+), and the like. For large-scale deployments, multiple MIMO antennas can be deployed together in a single system. For example, in a Wi-Fi system, multiple MIMO antennas can be deployed in a chain or rope-like configuration with various nodes being MIMO antennas (e.g., three or more MIMO antennas or nodes) that are communicatively coupled therebetween. With these interconnected systems of MIMO antennas or nodes, there is no guarantee that the MIMO antennas are pointing in a right direction to yield an optimized user experience.

Accordingly, there is a need for context aware MIMO antenna systems and methods.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 is radiation diagram of the node in the MIMO system showing exemplary antenna patterns for the MIMO antennas in accordance with some embodiments.

Figure 1:
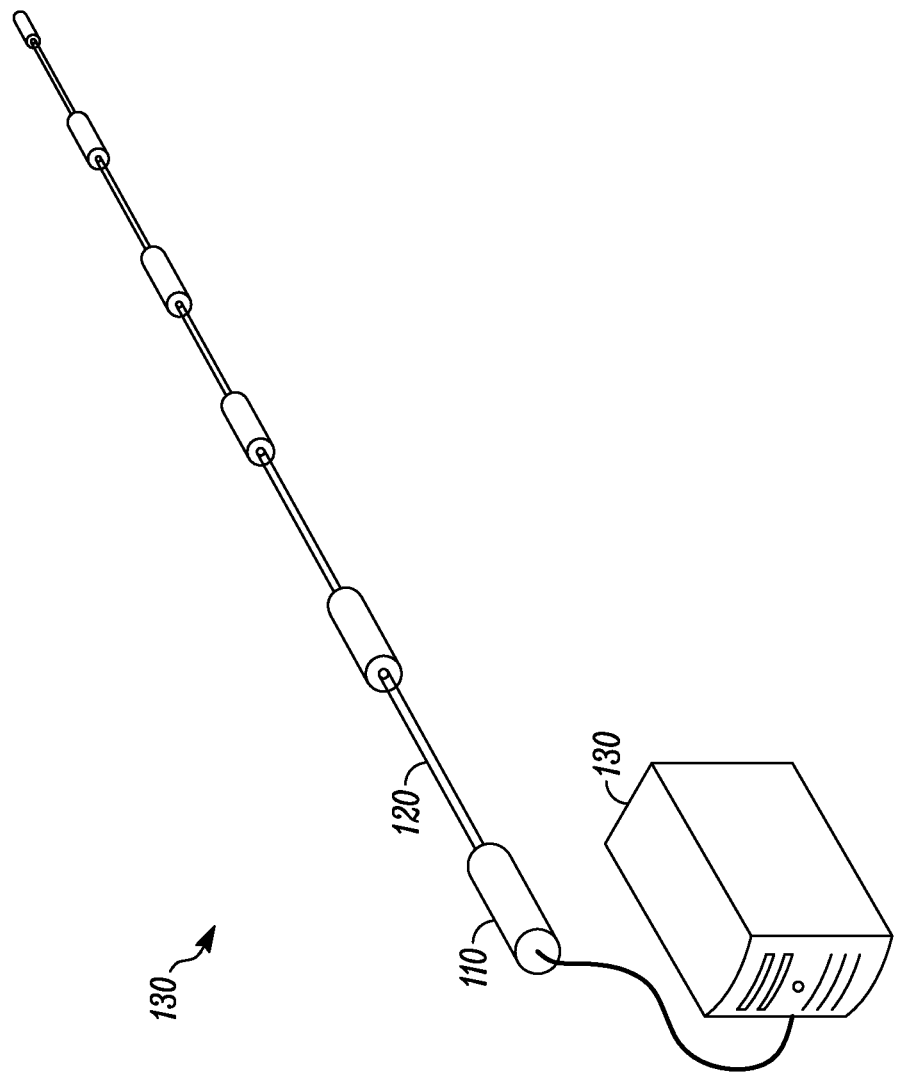
FIG. 1 is a schematic diagram of a multiple node MIMO system in a linear configuration in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In various exemplary embodiments, context aware MIMO antenna systems and methods are described. Specifically, the systems and methods provide, in a multiple MIMO antenna or node system, techniques of antenna/beam selection, calibration, and periodic refresh, based on environmental and mission context. The systems and methods can define a context vector as built by cooperative use of the nodes on the backhaul to direct antennas for the best user experience as well as mechanisms using the context vector in a 3D employment to point the antennas in a cooperative basis therebetween. The systems and methods utilize sensors in the nodes to provide tailored context sensing versus motion sensing, in conjunction with BER (Bit Error Rate) measurements on test signals to position an antenna beam from a selection of several "independent" antenna subsystems operating within a single node, as well as, that of its optically connected neighbor. The sensors determine the context of usage, which is used by an antenna selection processor which selects its best radiating antenna relative to that context, and, provides that information to its neighbors for them to use in their determination.

In an exemplary embodiment, the context aware MIMO antenna systems and methods propose a novel methodology of antenna/beam selection, calibration, and periodic refresh, based on environmental and mission context. A "context vector" suite of sensors is used to determine position and orientation of several optimally spaced nodes of a system, in space. This sensor suite is then incorporated and exercised in hundreds of other linked nodes having similar sensor configuration. If the orientation and context information is used, especially when neighbor BER calibration yields similar results in antenna beam selection, would migrate the selection towards the context vector. The modified result is where most users get Wi-Fi coverage over that of other solutions while the system may select an equal or slightly degraded test signal favoring beam pointing orientation.

In another exemplary embodiment, the context aware MIMO antenna systems and methods describe a method of modifying antenna pointing during calibration in a conformal deployment application using node context information of a plurality of nodes arranged in a semi random pattern. The method includes obtaining node context information including at least an orientation information of a calibration node from at least one sensor within the calibration node and forming a node context information vector. This node context information vector is dot product multiplied with a use case information vector to form a Desired Antenna Node (DAN) vector, wherein the use case information vector is defined by a server prior to deployment. Further, the method includes dot product multiplying Range vector(s) (Ri), defining a range of the calibration node with respect to each node of the plurality of nodes within the range of the calibration node, with the node context information vector of the calibration node to obtain a Node Directivity vector (Ndi) defining a measure of directivity of the calibration node with respect to each node of the plurality of nodes within the range of the calibration node. Further, the method includes using Ndi to select top three nodes having highest alignment with the calibration node from the plurality of nodes within the range of the calibration node. Further, the method includes computing bit error rate (BER) of a plurality of antennas of the calibration node with respect to a plurality of antennas of the top three selected nodes. Further, the method includes selecting the best antenna of the calibration node based on a dot product of the BER measures and the DAN vector, and using the best antenna of the calibration node for pointing towards the desired direction in the conformal deployment application.

In an exemplary embodiment, a method includes receiving sensor measurements from a plurality of nodes tethered therebetween and each with a plurality of antennas and at least one sensor; developing a context vector for each of the plurality of nodes based on the sensor measurements between the plurality of nodes, wherein the context vector for each node comprises conditions sensed by the node; determining a preferred orientation for each of the plurality of antennas based on the context vector for each of the plurality of nodes; performing calibration measurements for each of the plurality of antennas; and aligning one or more of the plurality of antennas at the plurality of nodes based upon the calibration measurements and the preferred orientation for each of the plurality of antennas.

In another exemplary embodiment, a system includes a server; a plurality of nodes tethered therebetween and each comprising a plurality of antennas and at least one sensor; wherein the server and the plurality of nodes are configured to perform the steps of: receiving sensor measurements from the plurality of nodes at the server; developing a context vector for each of the plurality of nodes based on the sensor measurements between the plurality of nodes, wherein the context vector for each node comprises conditions sensed by the node; determining a preferred orientation for each of the plurality of antennas based on the context vector for each of the plurality of nodes; performing calibration measurements for each of the plurality of antennas; and aligning one or more of the plurality of antennas at the plurality of nodes based upon the calibration measurements and the preferred orientation for each of the plurality of antennas.

In yet another exemplary embodiment, a server includes a network interface communicatively coupled to a plurality of tethered nodes, each of the tethered nodes comprising a plurality of antennas and at least one sensor; a processor; and memory storing instructions that, when executed, cause the processor to perform the steps of: receiving sensor measurements from the plurality of nodes; developing a context vector for each of the plurality of nodes based on the sensor measurements between the plurality of nodes, wherein the context vector for each node comprises conditions sensed by the node; determining a preferred orientation for each of the plurality of antennas based on the context vector for each of the plurality of nodes; directing the plurality of nodes to perform calibration measurements for each of the plurality of antennas; and directing the plurality of nodes to align one or more of the plurality of antennas based upon the calibration measurements and the preferred orientation for each of the plurality of antennas.

In an exemplary embodiment, a method includes receiving sensor measurements from a plurality of nodes tethered therebetween in a non-linear configuration and each with a plurality of antennas and at least one sensor; developing context of each of the plurality of nodes in a cooperative fashion to determine orientation; determining bit error rate values of the plurality of nodes in the cooperative fashion; utilizing the context, a predetermined use case, and the bit error rate values to select an optimized pointing antenna in one or more of the plurality of nodes.

In another exemplary embodiment, a system includes a server; a plurality of nodes tethered therebetween in a non-linear configuration and each comprising a plurality of antennas and at least one sensor; wherein the server and the plurality of nodes are configured to perform the steps of: receiving sensor measurements from the plurality of nodes at the server; developing context of each of the plurality of nodes in a cooperative fashion to determine orientation; determining bit error rate values of the plurality of nodes in the cooperative fashion; utilizing the context, a predetermined use case, and the bit error rate values to select an optimized pointing antenna in one or more of the plurality of nodes.

In yet another exemplary embodiment, a server includes a network interface communicatively coupled to a plurality of tethered nodes in a non-linear configuration, each of the tethered nodes comprising a plurality of antennas and at least one sensor; a processor; and memory storing instructions that, when executed, cause the processor to perform the steps of: receiving sensor measurements from the plurality of nodes; developing context of each of the plurality of nodes in a cooperative fashion to determine orientation; receiving bit error rate values of the plurality of nodes in the cooperative fashion; utilizing the context, a predetermined use case, and the bit error rate values to select an optimized pointing antenna in one or more of the plurality of nodes.

FIG. 1 is a schematic diagram of a multiple node MIMO system 100 in a linear configuration in accordance with some embodiments. The MIMO system 100 includes a plurality of nodes 110 interconnected via a connection 120 and backhauled to a server 130. The MIMO system 100 may be referred to as a "centipede" system based on its physical appearance. In an exemplary embodiment, the MIMO system 100 provides Wi-Fi access via the nodes 110 to a large area, although other wireless technologies are also contemplated (e.g., 4G, 3GPP LTE, WiMAX, HSPA+, and the like). For example, the MIMO system 100 can be used to rapidly deploy Wi-Fi access or other types of wireless access in various locations, such as conference centers, hotels, office buildings, sporting areas, shopping malls, and the like. Each of the nodes 110 can be an access point or the like and spaced at various distances apart. For example, the nodes 110 can be any distance apart, e.g. 2 to 20 m apart, and the overall length of the MIMO system 100 can be any distance, e.g. 100+m. Each of the nodes 110 can have three or more sets of MIMO antennas, e.g. Wi-Fi antennas operating dual-band from 2.4-2.5 GHz and 5.1-5.9 GHz.

The connection 120 can be a data and/or power cable that provides data and/or power between the nodes 110 and the server 130. For example, the connection 120 can include a high-speed fiber optic cable, a coaxial cable, twisted pair, etc. The connection 120 can also include wireless for one or more of the links between the nodes 110 and the server 130. The power can include power over Ethernet (PoE) or a direct power connection. The server 130 can include a computer, server, appliance, etc. that is communicatively coupled to each of the nodes 110 via the connection 120. The server 130 can also include an external network connection to provide network connectivity to the nodes 110. Generally, the server 130 provides management and provisioning of the nodes 110 as well. As the MIMO system 100 is deployed there is no guarantee that the desired coverage antenna will be pointing in the right direction to yield a pleasant user experience for its context of use. In FIG. 1, the MIMO system 100 is currently being developed to deploy as a straight rope configuration where nodes 110 are located side by side, i.e. in a straight line. In this straight line configuration, context can be used to determine orientation so that the simple matrix components can be reduced to simple BER values and then Cross Product multiplied with the use case orientation vector ultimately selecting an optimized pointing antenna (not scanned).

Figure 2:
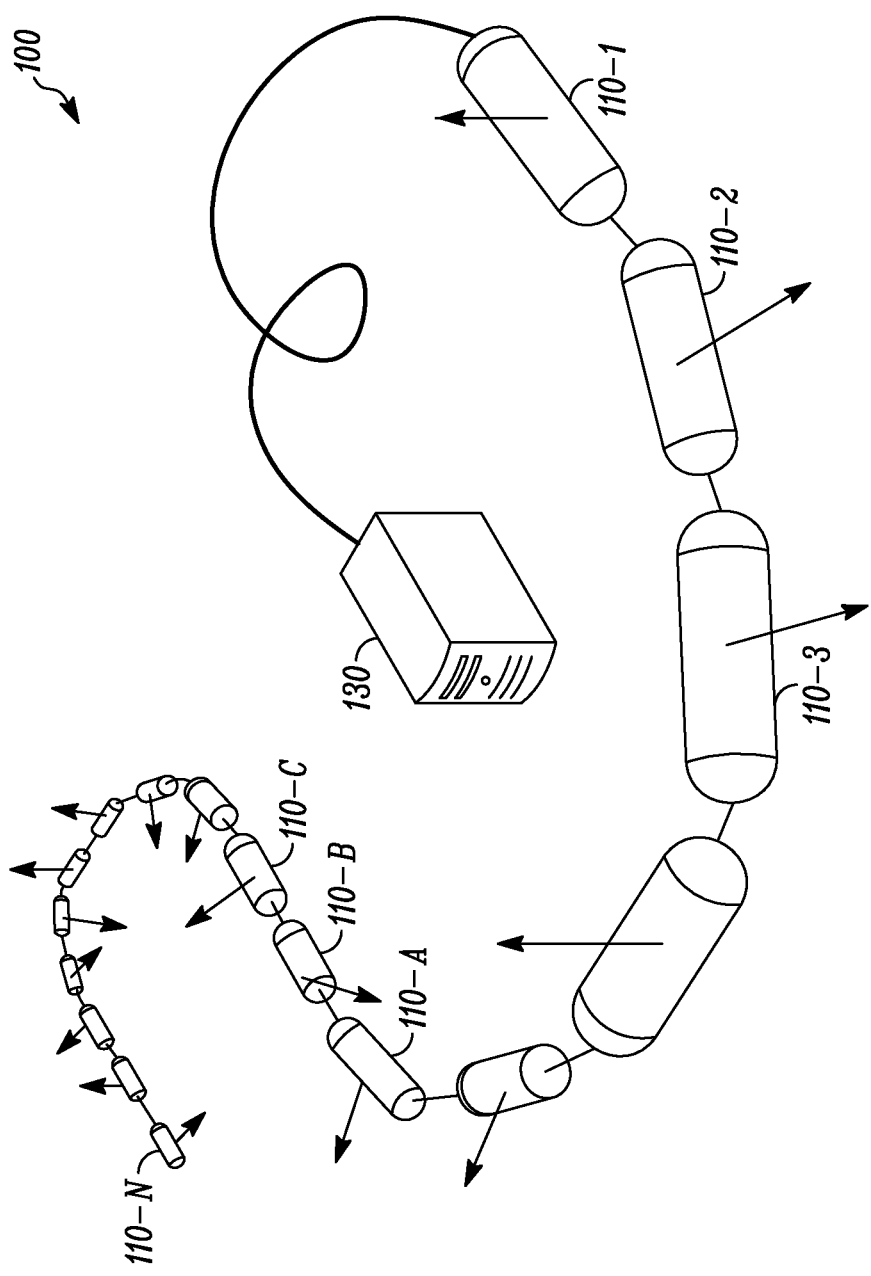
FIG. 2 is a schematic diagram of a multiple node MIMO system of FIG. 1 in a non-linear configuration in accordance with some embodiments.

FIG. 2 is a schematic diagram of a multiple node MIMO system 100 in a non-linear configuration in accordance with some embodiments. In practical deployments of the MIMO system 100, it is more likely to resemble the configuration in FIG. 2 and the nodes 110 may not be axial to the desired plane of operation nor positioned horizontally, hence the need for sensors and calibration. In particular, the MIMO system 100 can include various nodes 110 such as node 110-1, node 110-2, node 110-3, . . . , node 110-A, node 110-B, node 110-C, . . . , node 110-N. That is, practical deployments of the MIMO system 100 can include N nodes 110, N being an integer greater than 1. The connections 120 between the N nodes 110 can be evenly spaced, variably spaced, or both. The non-linear configuration includes bends in the connections 120 between the nodes 110 as well as the nodes 110 being in different orientations. For example, FIG. 2 illustrates both the connections 120 including bends as well as the nodes 110 being in different orientations as illustrated by arrows in FIG. 2. The non-linear configuration can be thought of as a random rope-like configuration.

In FIG. 2, the nodes 110 are spaced out equally along the connections 120 which can be optical rope to provide several access points but are in semi-random configurations. The nodes 110 are semi random because of the nature of the rope device that attaches them on one axis. There may be some nodes that are oriented towards others that would be better suited for calibration. This can be seen in FIG. 2 with the nodes 110-1, 110-2, and 110-3 more oriented towards the nodes 110-A, 110-B, 110-C rather than neighboring nodes. As the MIMO system 100 is deployed in the non-linear configuration there is no guarantee that a primary antenna will be pointing in the right direction to yield a pleasant user experience for its context of use. In an exemplary embodiment, a requirement of the MIMO system 100 is to develop antenna beam coverage to satisfy Wi-Fi capacity of 4 Mbps/10 Mbps wireless throughput per user which incorporates user experiences using video (e.g., assumed to be streaming video to mobile device, Video will be H.264, variable bitrate average 2 Mbps) and data usage such as Internet browsing, social media updates, interactive in-stadium applications, and the like. Hence a calibration process can be determined by context and orientation rather than simple neighbor analysis.

When the MIMO system 100 is deployed it can cover several hundred feet in length in an infinite number of positions having several optimally spaced nodes 110. The time spent for an installer to record the position and calibrate the antenna pointing after deployment is burdensome and expensive. The antenna systems and methods integrates a "context vector" suite of sensors used to determine its position and orientation in space. This sensor suite is then incorporated and exercised in hundreds of other linked nodes 110 having similar sensor configuration. The sensor information is sent to the server 130 where the usage context is determined and its position and orientation is determined to create a rope layout configuration. The usage context can be determined such as described in commonly-assigned U.S. Pat. No. 8,320,932 entitled "METHOD AND SYSTEM OF UTILIZING A CONTEXT VECTOR AND METHOD AND SYSTEM OF UTILIZING A CONTEXT VECTOR AND DATABASE FOR LOCATION APPLICATIONS," the contents of which are incorporated by reference herein.

From this configuration, the server 130 instructs antenna subsystems in each node 110 to become active such that a Wi-Fi link can be established. The antenna patterns of each antenna subsystem will allow some energy from neighboring nodes to be received if a worst case deployment would occur. If the server map shows such a system a simple neighbor calibration can be done. In this case, based on sensor context, the antennas can be selected using a few sensors, such as the accelerometer and a neighbor BER measure. This ensures a first pass calibration with a high degree of confidence. If the sensor context configuration is such that the rope appears serpentine, then the server 130 can instruct nodes 110 that are opposing each other for use in calibration in conjunction with neighboring nodes 110 (this could occur in overhead shopping (fixed or random event) store deployment or construction sites, etc.). Other system configurations can be within the above two extremes mentioned. After deployment, the calibration can commence, and the optimum antenna configuration can be selected eliminating any voltage standing wave ratio (VSWR) and orientation ambiguity (as measured by BER rate tests or power coupler measuring reflected energy at antenna ports). Once calibrated, the MIMO system 100 can utilize the context sensor suite to continually optimize usage. Depending on sensor feedback, some nodes 110 can be shut down (lights off in area, very low crowd noise, etc.) to conserve energy which helps it be part of the "green environment" solution.

Figure 3:
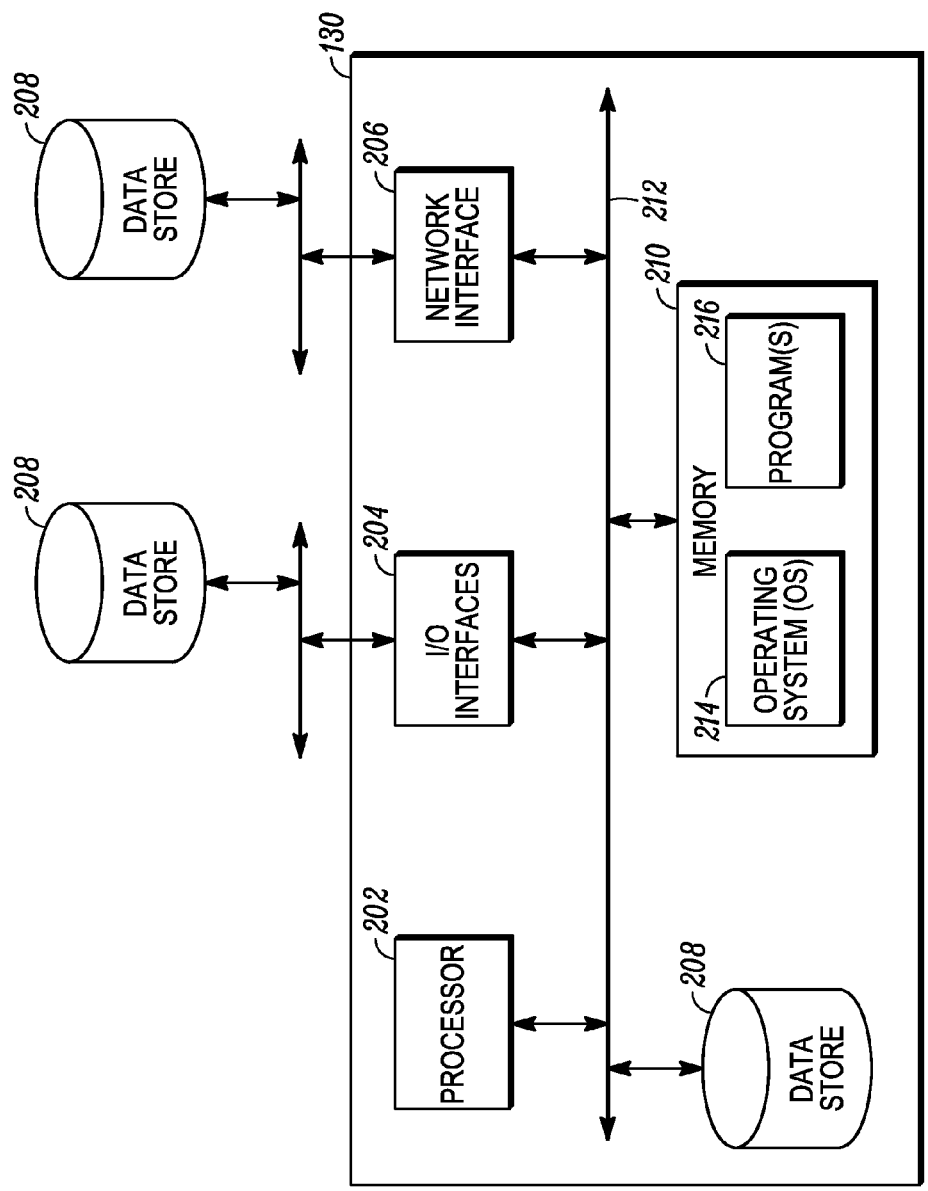
FIG. 3 is a block diagram of the server in the MIMO system of FIG. 1 in accordance with some embodiments.

FIG. 3 is a block diagram of the server 130 in the MIMO system 100 in accordance with some embodiments. The server 130 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 130 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 130, a semiconductor-based microprocessor (in the form of a microchip or chip set), or generally any device for executing software instructions. When the server 130 is in operation, the processor 202 is configured to execute software stored within the memory 210, to communicate data to and from the memory 210, and to generally control operations of the server 130 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface. In an exemplary embodiment, the connection 120 to the server 130 can be via the I/O interfaces 204 such as fibre channel, Infiniband, etc.

The network interface 206 may be used to enable the server 130 to communicate on a network. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 206 may include address, control, and/or data connections to enable appropriate communications on the network. In an exemplary embodiment, the connection 120 is formed to the server 130 via the network interface 206 such as via GbE, 10 GbE, or the like. The data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 130 such as, for example, an internal hard drive connected to the local interface 212 in the server 130. Additionally in another embodiment, the data store 208 may be located external to the server 130 such as, for example, an external hard drive connected to the I/O interfaces 204 (e.g., SCSI or USB connection). In a further embodiment, the data store 208 may be connected to the server 130 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Figure 4:
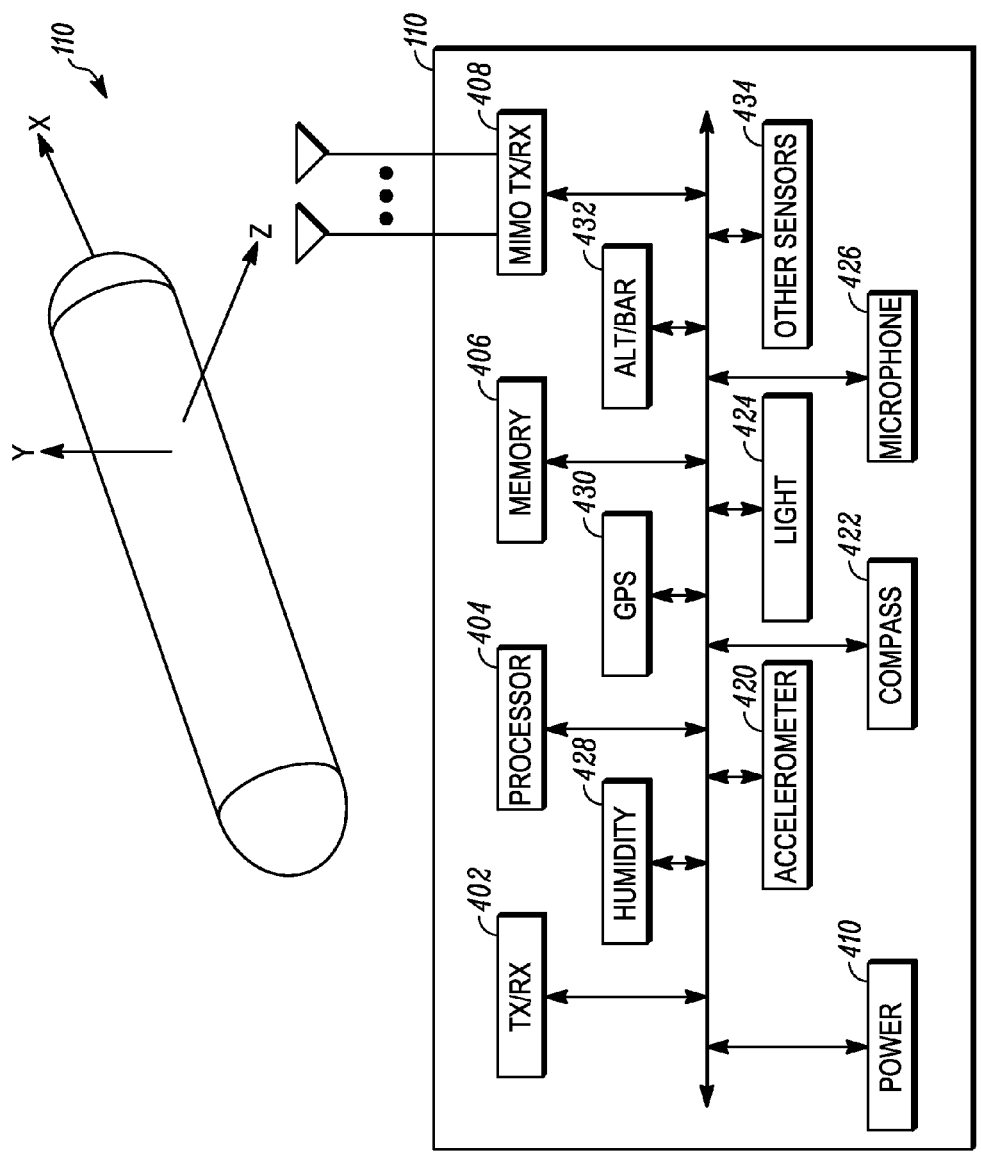
FIG. 4 is a schematic diagram of an exemplary implementation of the node in the MIMO system of FIG. 1 in accordance with some embodiments.

FIG. 4 is a schematic diagram of an exemplary implementation of the node 110 in the MIMO system 100 in accordance with some embodiments. The node 110 includes a transceiver 402, a processor 404, memory 406, MIMO antennas 408, and power 410. It should be appreciated by those of ordinary skill in the art that FIG. 4 depicts the node 110 in an oversimplified manner, and a practical embodiment may include additional components and suitably configured processing logic to support known or conventional operating features that are not described in detail herein. The transceiver 402 is configured to provide the connection 120 to another node 110 and/or to the server 130. For example, every intermediate node 110 in the MIMO system 100 has the transceiver 402 connected to other nodes 110. The last node 110 in the MIMO system 100 has a single transceiver 402 connected to another node 110, and the first node in the MIMO system 100 has the transceiver 402 connected to the server 130 and to another node 110. The transceiver 402 can be electrical or optical and provides data interconnection between the nodes 110 and the server 130.

The processor 404 is a hardware device for executing software instructions. The processor 404 may be any custom made or commercially available processor, a central processing unit (CPU), an auxiliary processor among several processors associated with the node 110, a semiconductor-based microprocessor (in the form of a microchip or chip set), or generally any device for executing software instructions. When the node 110 is in operation, the processor 404 is configured to execute software stored within the memory 406, to communicate data to and from the memory 406, and to generally control operations of the node 110 pursuant to the software instructions. The memory 406 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 406 may incorporate electronic, magnetic, optical, and/or other types of storage media. Note that the memory 406 may have a distributed architecture, where various components are situated remotely from one another, but can be accessed by the processor 404.

The MIMO antenna 408 enables wireless communication to an external access device or network. Any number of suitable wireless data communication protocols, techniques, or methodologies can be supported by the MIMO antenna antennas 408, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. In an exemplary embodiment, the MIMO antenna antennas 408 operates three or more sets of MIMO antennas, e.g. Wi-Fi antennas operating dual-band from 2.4-2.5 GHz and 5.1-5.9 GHz.

The power 410 provides power to the node 110 and associated components included therein. The power 410 can be provided over the connection 120. In an exemplary embodiment, the power 410 can be Power over Ethernet (PoE), direct power, batteries, and the like. The components (402, 404, 406, 408, and 410) are communicatively coupled via a local interface 412. The local interface 412 may be, for example but not limited to, one or more buses or other wired or wireless connections, as is known in the art. The local interface 412 may have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

Additionally, the node 110 can include a sensor suite with an accelerometer 420, a compass 422, a light sensor 424, a microphone 426, a humidity sensor 428, a global positioning system (GPS) sensor 430, an altimeter/barometer 432, and other sensors 434. Each of the sensor suite components is also communicatively coupled to the local interface 412 and receiving power from the power 410. Also, the sensor suite components can interface data with the processor 404 for implementing the systems and methods described herein. The sensor suite components selected is similar to that found in previously incorporated U.S. Pat. No. 8,320,932 where the sensor suite components are used more for static sensing of position rather than dynamic sensing. Also, the sensor suite components can be similar to those described in commonly-assigned U.S. Pat. No. 7,792,640 entitled "ALTITUDE CORRECTION OF A NAVIGATIONAL DEVICE," the contents of which are incorporated by reference herein.

In the systems and methods described herein, the sensor suite components provide a specific mission/context for controlling antenna selection based on deployment. The systems and methods described herein are also unique due to the dependence on neighboring nodes 110 and their orientation. The node 110 can include some or all of the sensor suite components. In an exemplary embodiment, a minimum sensor set could include a single sensor, such as the compass 422, the accelerometer 420, or the altimeter/barometer 432, this provides orientation and altitude. Other sensors can be included to provide additional information that aids in selecting the best antenna configuration.

The accelerometer 420 is configured to detect the orientation of the node 110. Similarly, the compass 422 is also configured to detect the orientation of the node 110. The light sensor 424 can be a phototransistor or diode having a photo sensor output capable of detecting frequency characteristics of light. In addition to detection of ambient light level, the photo sensor output can be amplified and filtered to detect certain light frequencies of interest, in particular the 50 Hz/60 Hz ranges found in incandescent lighting and the 400 Hz ranges commonly found in electronic ballasts for florescent lighting. The detection and strength of this signal can be used in an algorithm to define context vectors and match such context vectors to appropriately modify the operation of the node 110 or its subsystems. The microphone 426 can be a pressure sensor that detects sounds, ambient noise, etc. The humidity sensor 428 can also be a temperature sensor and can configured to detect atmospheric conditions. The GPS sensors 430 can use GPS satellite signals to triangulate exact location of the node 110. The altimeter/barometer 432 can measure the altitude of the node 110 above a fixed level. The other sensors 434 can be any type of sensors that provide information that can be used to derive a context of the node 110.

In various exemplary embodiments, the MIMO system 100 provides aggregate information from the sensors, perhaps combined with local time, to define a context vector for a given location. In general, the context vector includes values for environmental or other conditions sensed at each node 110. A context vector can be absolute, or the context vector can be relative to a known location determined by other means. Multiple locations could potentially have identical context vectors, so a matching algorithm can be used to select the most likely one. In this regard, the context vector itself can be used to determine or refine location. In another aspect, a current context vector can be compared to temporally proximate context vectors to detect a change of context. Some context transitions may have useful location applications, such as the ability to activate, suspend, favor, disfavor, or initiate certain location technologies. Since GPS devices can easily drain current attempting to obtain a position fix while indoors, embodiments herein can be used to detect a transition between indoors and outdoors, for example, to make a decision whether to suspend or modify GPS operation for the purpose of power savings. For example, switching location technologies from indoor to outdoor is described in commonly-assigned U.S. Pat. No. 6,801,159 entitled "Device for use with a portable inertial navigation system ("PINS") and method for transitioning between location technologies," the contents of which are incorporated by reference herein. Embodiments herein can provide a means to detect an indoor or outdoor radio context, which allows specific location technologies to be favored or disfavored, based on their likelihood of success. Turning off a GPS subsystem when it is not likely to succeed can result in appreciable battery savings.

FIG. 5 is radiation diagram of the node 110 in the MIMO system 100 showing exemplary antenna patterns 502, 504, 506 for the MIMO antennas 408 in accordance with some embodiments. The antenna patterns 502, 504, 506 are described herein for illustration purposes with reference to dual-band Wi-Fi (e.g., 2.5 GHz and 5.5 GHz), but those of ordinary skill in the art will appreciate other technologies, frequencies, etc. are also contemplated. The antenna pattern 502 can be generally oriented in a Y-plane and can include the dual-band Wi-Fi in an overlapping pattern between the 2.5 GHz band and the 5.5 GHz band. The antenna pattern 504 can be generally oriented in a Z-plane and can include the dual-band Wi-Fi in an overlapping pattern between the 2.5 GHz band and the 5.5 GHz band. The antenna pattern 506 can be generally oriented in an X-plane and can include the dual-band Wi-Fi in an overlapping pattern between the 2.5 GHz band and the 5.5 GHz band. Accordingly, in this exemplary embodiment, the node 110 includes 2×2 MIMO with six patterns—three for the 2.5 GHz band and three for the 5.5 GHz band.

Figure 6:
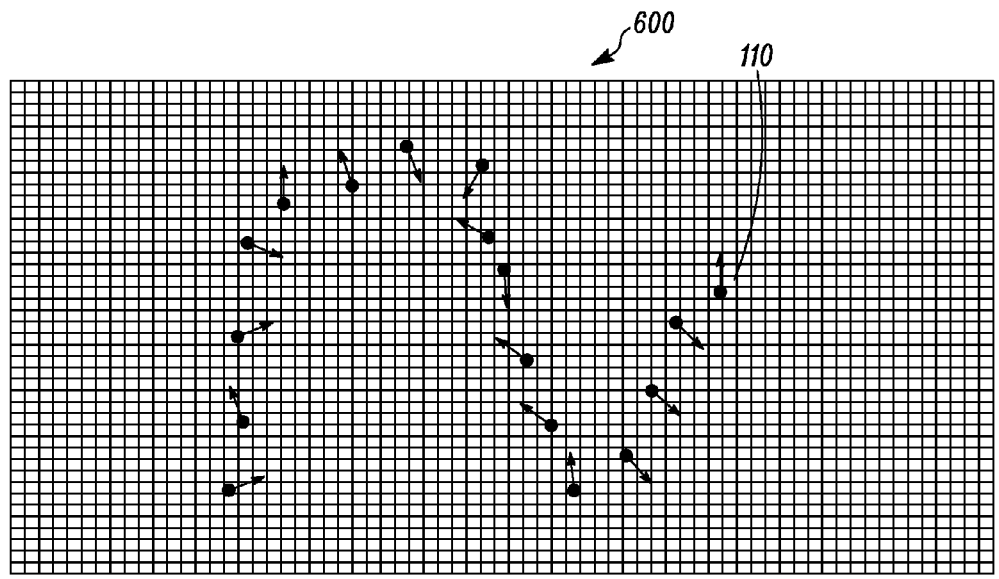
FIGS. 6 and 7 are two-dimensional plots of an exemplary deployment of the MIMO system in accordance with some embodiments.
Figure 7:
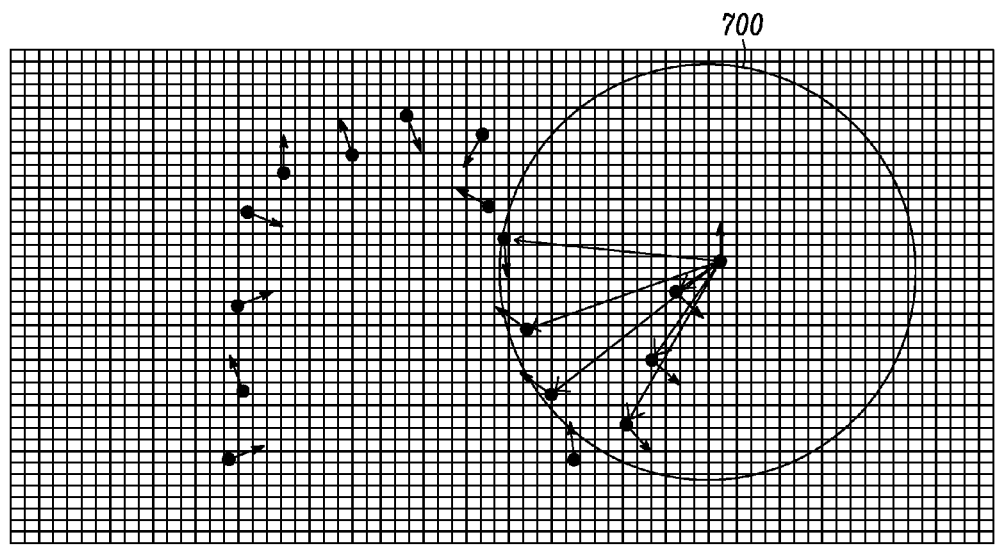

FIGS. 6 and 7 are two-dimensional plots of an exemplary deployment of the MIMO system 100 in accordance with some embodiments. FIG. 6 illustrates an exemplary initial configuration 600 of the MIMO system 100. In the two-dimensional plots, each circle represents one of the nodes 110 in the MIMO system 100 and each arrow represents an Orientation Context vector of its associated node 110. Once powered, the server 130 can poll each of the nodes 110 to determine its chassis orientation relative to a fixed point, e.g. geographic north plus earth gravity (g), although other vectors could be used if prior knowledge of the deployment is known. The arrows in FIG. 6 illustrate the node hardware Orientation Context vector in each node 110 which is determined solely on sensor information. Of note, the Orientation Context vector is not the antenna pointing angle of the node 110.

Once the node Orientation Context vector [NO] is established for each of the nodes 110, the server 130 can perform additional functions that further refine the pointing reference ultimately used for beam selection. Note this is not a phased array configuration but a collection of several antennas of which one will be selected for use during operation. In the exemplary embodiment of FIG. 5, the antenna pattern coverage includes single beam Wi-Fi and two beams for MIMO operation (i.e., this exemplary design has six antenna ports to work with forming three regions of pattern coverage, hence in a MIMO configuration, the same spatial beam could be covered by two antennas. Although possible, it is not likely the preferred case due to the definition of MIMO).

Each Orientation Context vector [NO] is dot product multiplied with a use case point vector [NUC] that was defined by the server 130 prior to deployment. For the ease of explanation, the use case, in an exemplary embodiment, could be the overhead structure of a weekend flee market tent area. Here, it is expected that the rope would follow a serpentine pattern following the tent overhead structure poles with the ideal beam pointing down (with the gravity vector). The use case vector [NUC] could be for each node to be pointing directly down like a flashlight beam. Because the MIMO system 100 is similar to a rope in nature, there is no guarantee that any particular antenna beam will be doing just that, hence the need for calibration to select the most optimum beam.

In FIG. 7, since the server 130 can compute the layout coordinates of each node 110, it determines a position vector to each node 110 relative to a specific range boundary circle 700 to limit the number of nodes used in the calibration process (the range circle is determined with the coordinate layout). The range vector [Ri] is then dot product multiplied with the Orientation vector [NO] to get a measure of directivity [NDi] to each node 110 within the boundary circle 700. The Node directivity Vector [NDi] is then used by the server 130 to select the top three nodes 110 having highest alignment with the calibration nodes' Orientation Context vector [NO] to be used for a calibration matrix (the number of nodes is arbitrary but three can be selected to reduce matrix complexity).

The calibration matrix is then created by capturing each antenna configuration BER for both bands using a code sequence developed for doing such a task and is well known to those skilled in the art. If one antenna is used for both bands then an additional test is needed that correlates both band BER against antenna pointing and is not discussed herein. If:

$$A_1 := \begin{pmatrix} \alpha \\ \beta \\ \gamma \\ A \\ B \\ \Gamma \end{pmatrix}$$

$$A_2 := (\delta \quad \theta \quad \sigma \quad \Delta \quad E \quad Z)$$

$$A_3 := \begin{pmatrix} \lambda \\ \mu \\ \nu \\ \Lambda \\ M \\ N \end{pmatrix}$$

where $A_1$ represented the calibration node and $A_2$, $A_3$ are directional nodes all having BER elements, then the methodology would be as follows:

Let:

$\vec{Ri}$ = Node i Range Vector
$\vec{ND}$ = Node Directivity Vector
$\vec{NO}$ = Node Orientation Vector
$\vec{NCO}$ = Node Context Orientation Vector
$\vec{NUC}$ = Node Use Case Vector
$\vec{DAN}$ = Desired Antenna Node pointing
$\vec{TAi,n}$ = Test Node (i), using Test antenna (n)

BER test signals that are sent from each server assigned test node 110 use an antenna that is closely aligned with the Calibration Node Range Vector via the dot product [TAi,n] and [Ri]. This is not optimizing the Test Node, so only one antenna that gives us the best pointing angle is used. Hence the antenna used by the Test Node is determined by the Antenna vector [NAn] dot product with the Range Vector of the Calibration Node [RCi]. This is repeated for each server 130 assigned Test Node. The Test antenna used is the one with the highest dot product value.

The BER test signal is sent from each test antenna A2, A3 to the Calibration Node A1 antenna array to establish a quality measure of signal (small case Greek letters can represent 2 GHz antennas and capital Greek letters can represent 5 GHz). This may or may not resolve to one antenna and most likely there will be conflicts. The server 130 can perform a dot product multiplication with of each of the highest BER antenna pointing vectors with the Desired Antenna Node [DAN] pointing vector to get the Calibration Node Antenna for use in the product operational configuration. This process continues for each node 110 in the MIMO system 100.

Figure 8A:
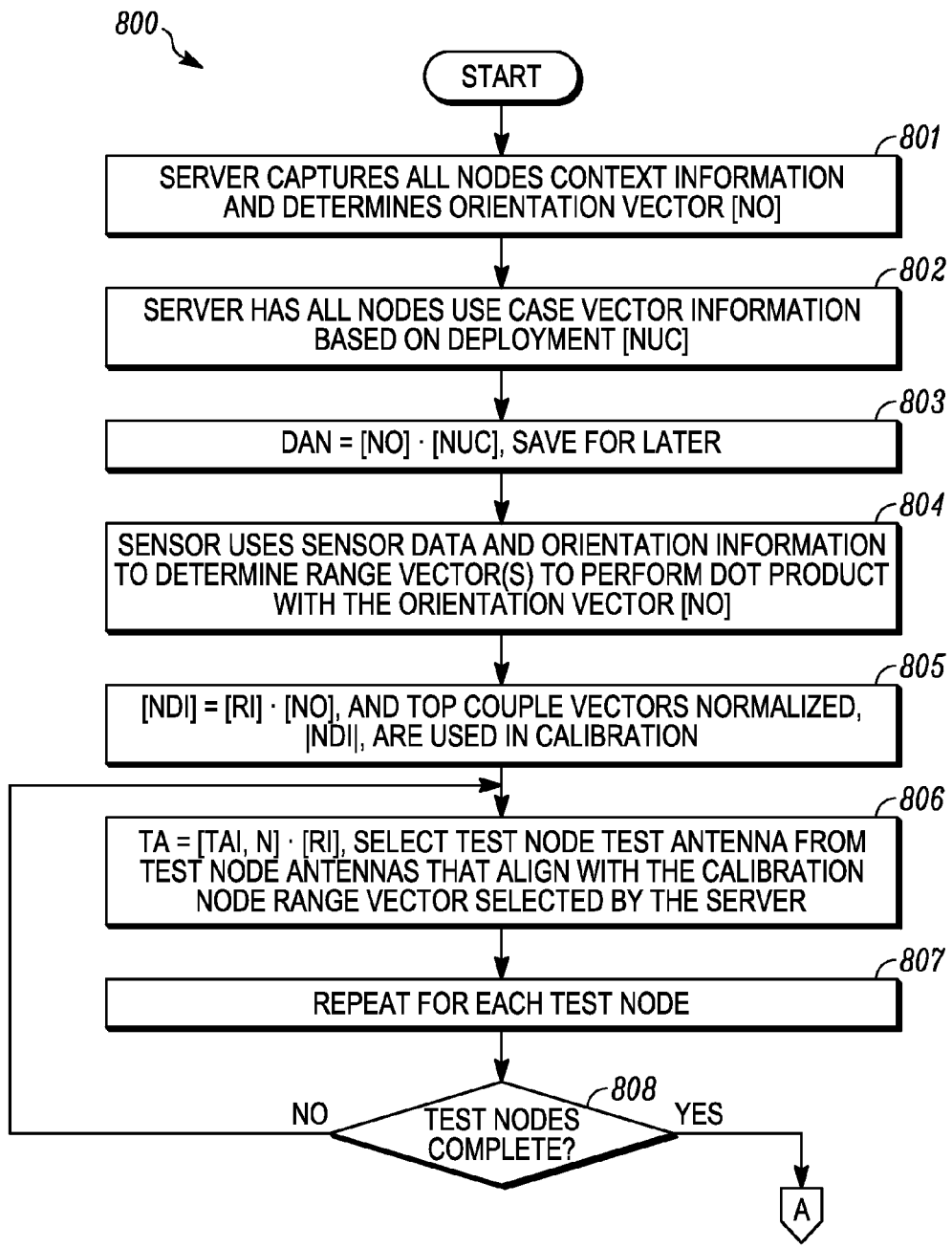
FIGS. 8A and 8B are flowcharts of a method for modifying antenna pointing during calibration of the MIMO system using node context information in accordance with some embodiments.
Figure 8B:
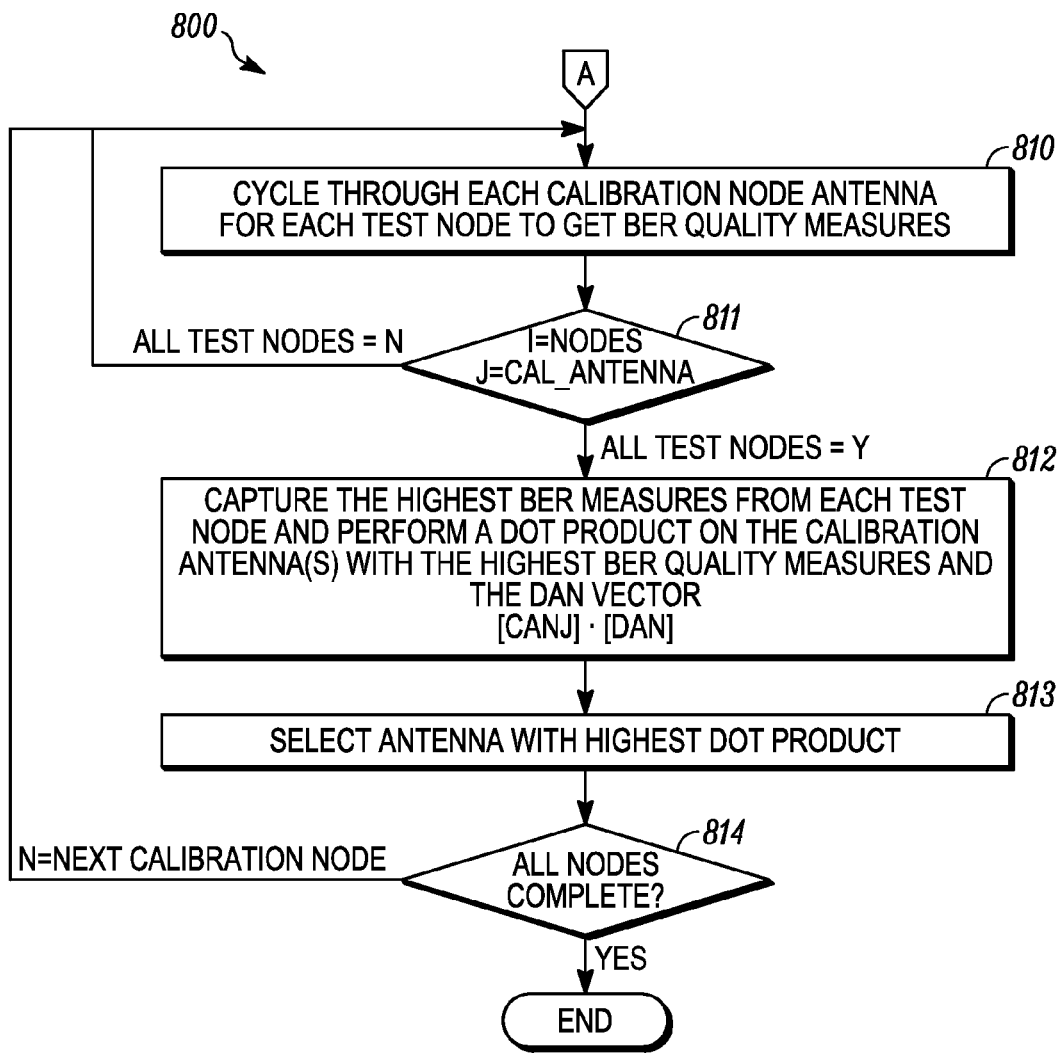

FIGS. 8A and 8B are flowcharts of a method 800 for modifying antenna pointing during calibration of the MIMO system 100 using node context information. Specifically, the method 800 can be implemented by the server 130 and the nodes 110. First, the server 130 captures all nodes context information and determines an Orientation Vector, [NO], for each node (step 801). Again, the Orientation Vector, [NO], contains primarily orientation data relative to a known pointing reference vector. The server 130 has all nodes 110 use case vector, [NUC], information based on deployment (step 802). Again, the use case vector [NUC] defines how each node 110 is expected to be used, e.g. each node to be pointing directly down like a flashlight beam. The Desired Antenna Node [DAN] pointing vector for each node is the dot product of the Orientation Vector, [NO], and the use case vector, [NUC], and is stored for later use (step 83).

The sensor components in the nodes 110 use sensor data and orientation information to determine Range Vector(s), [Ri], to perform dot product with the Orientation Vector [NO] (step 804). The range vector [Ri] then is dot product multiplied with the Orientation vector [NO] to get a measure of directivity [NDi] to each node 110 within the boundary circle 700, and the top couple vectors normalized |NDi| are used in the calibration (step 805). For example, two or three of the top |NDi| may be selected. For the top |NDi| selected, TA=[Tai, n]·[Ri], the method 800 selects test node test antenna from test node antennas that align with the Calibration Node Range Vector selected by the server 130 (step 806), and this is repeated for each test node (step 807). Once all test nodes are complete (step 808), the method 800 continues in FIG. 8B.

The method 800 cycles through each Calibration Node antenna for each test node to get BER quality measures (step 810). Once all test nodes are complete (step 811), the method 800 captures the highest BER measures from each test node and performs a dot product on the Calibration Antenna(s) with the highest BER quality measures and the DAN vector, [CANj]·[DAN] (step 812). For each test node, the method 800 selects the antenna with the highest dot product (step 813), and the method 800 continues until all test nodes are complete (step 814). Based on the method 800, the antennas can be directed for the best user experience at the various nodes 110 based on the context vector as built by cooperative use of the nodes on the backhaul.

The method 800 provides calibration of a tethered nodes system, such as the MIMO system 100, in a conformal layout where the node to node performance is dependent on the context information associated with each device. The context information contains primarily orientation data relative to a known pointing reference vector (e.g., geographic north, etc.). The tethered nodes system terminates in or is communicatively coupled to a server. Prior knowledge is known regarding the deployment methodology without regard to precise orientation of each tethered node, e.g. deployed overhead in a stadium, conference center, office building, store, mall, etc., and the calibration is enhanced using this context information.

The method 800 also provides beam pointing where the nodes 110 are tethered and connected to the server 130 where data transfer performance can be measured from node to node as directed by the server 130. The server 130 can include a data performance program that generates a test signal for transmit in one node and receives that signal in a tethered mode to determine BER or similar performance metric. The server 130 can include a data performance program that can select a node antenna for transmit and a node antenna for receive to determine BER or similar performance metric. The server 130 can include a data performance program that receives tethered node sensor information from a transmit and receive node for the purposes of determining BER or similar performance metric. The server 130 can include a context vector interpreter program that utilizes receive and transmit node performance to modify, or weigh importance of a particular performance metric to select a pointing beam based on a nodes context vector.

The context vector is built to contain the tethered nodes orientation. A subset of the context vector can also contain additional sensor data not typically associated with antenna beam pointing. A context vector data base can provide information of the operational environment of the tethered nodes.

Also, there can include cases in the systems and methods described herein where there are multiple vectors such as, for example, to cover both sides of a long corridor or three corridors leading to a "T" junction. In these cases, the dot-product operation would be repeated for each vector and the resulting vector of coefficients (projections) could be weighted in linear combination fashion to yield a single goodness factor for each pattern available on the node under analysis.

Figure 9:
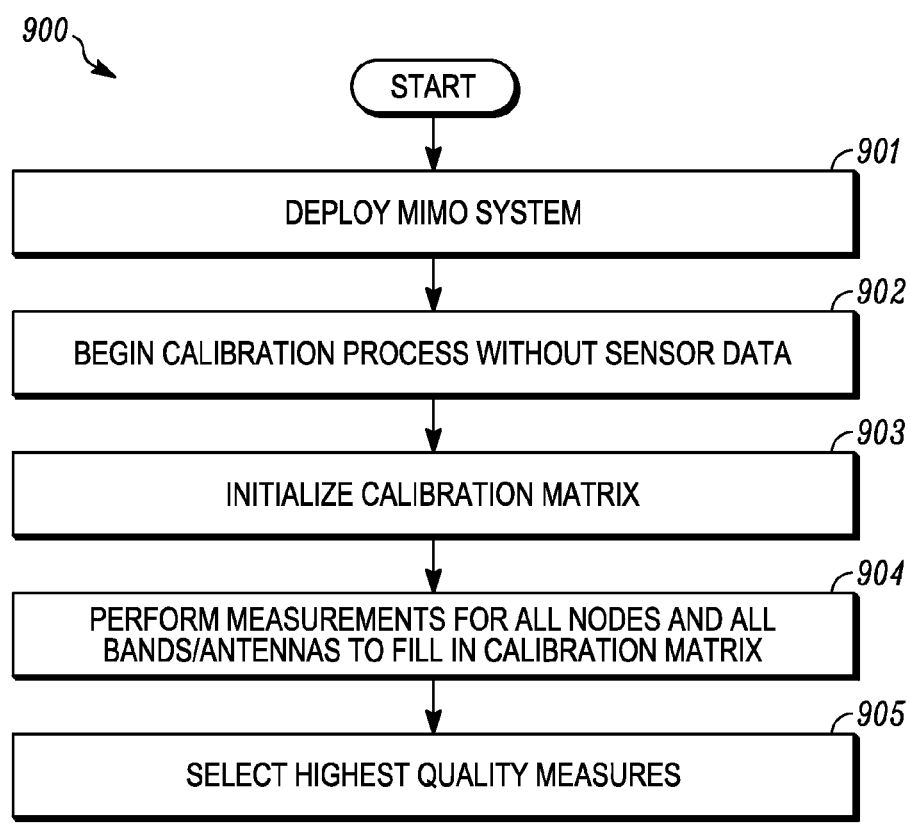
FIG. 9 is a flowchart of a method for a calibration process for the MIMO system without using node context information in accordance with some embodiments.
Figure 10:
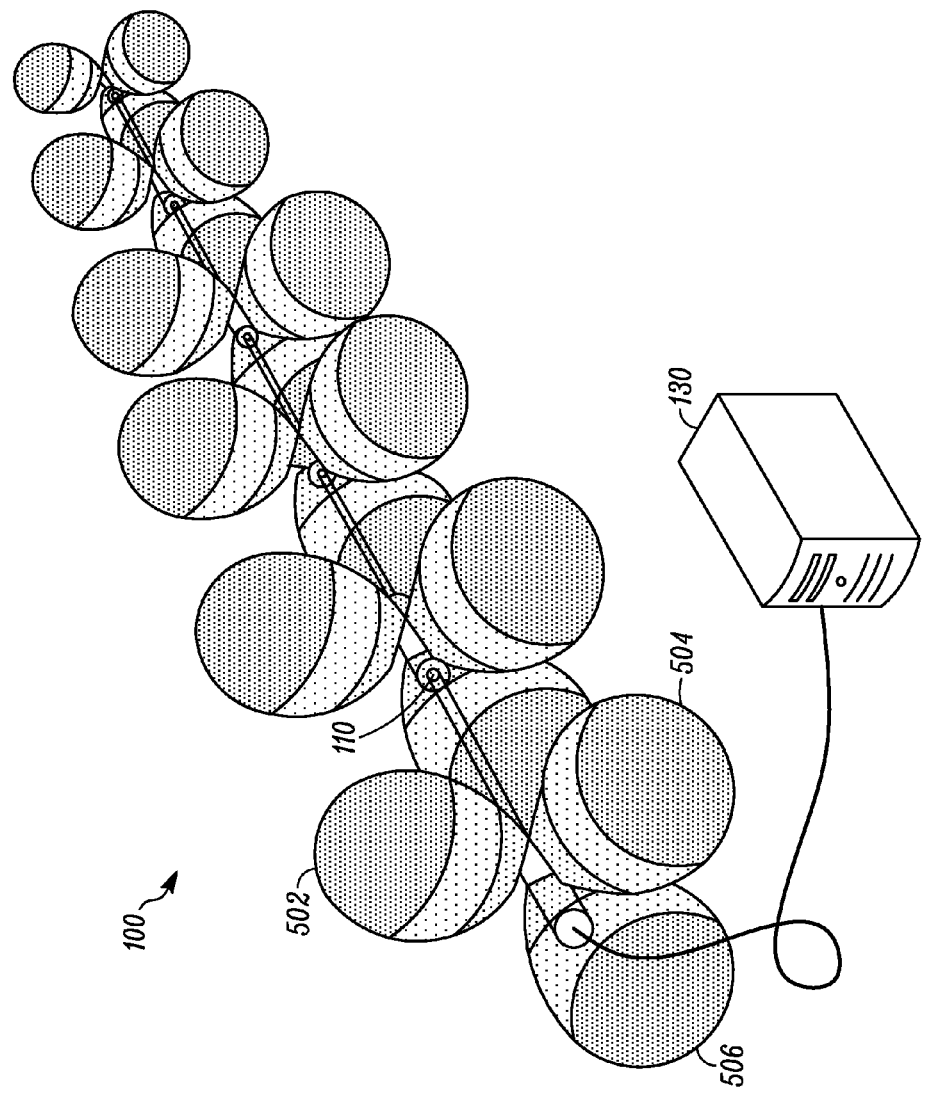
FIGS. 10, 11, 12, and 13 are schematic diagrams of the multiple node MIMO system in a linear configuration showing various antenna beam patterns in accordance with some embodiments.

FIG. 9 is a flowchart of a method 900 for a calibration process for the MIMO system 100 without using node context information in accordance with some embodiments. The method 900 can be implemented by the server 130 and the nodes 110. The method 900 includes initially deploying the MIMO system 100 (step 901). Here, the MIMO system 100 is physically installed and powered up. The method 900 includes beginning a calibration process without sensor data (step 902). The method 900 calibrates the MIMO system 100 without data from the various sensor components (or an MIMO system 100 without sensors). The method 900 includes initializing a calibration matrix (step 903). The calibration matrix forms data of all nodes, antennas, and bands of operation. The initialization determines the size of the matrix (e.g., number of nodes, antennas, bands of operation, etc.), and what tests will be performed. Next, the method 900 includes performing measurements for all nodes and associated bands/antennas to fill in the calibration matrix (step 904). Finally, the method 900 includes selecting nodes, antennas, bands, etc. with the highest quality measures for use in operation (step 905).

FIGS. 10, 11, 12, and 13 are schematic diagrams of the multiple node MIMO system 100 in a linear configuration showing various antenna beam patterns in accordance with some embodiments. Each of the nodes 110 in FIGS. 10, 11, 12, and 13 include the antenna patterns 502, 504, 506. After the MIMO system 100 is deployed, it can take on any antenna assigned beam pointing direction. For the purposes of understanding the orientation of all the nodes 110, in FIG. 10 the nodes 110 are assumed aligned and pointing in the same direction. Again, the systems and methods described herein are illustrated with reference to Wi-Fi MIMO antennas operating in the 2.4 GHz and 5.5 GHz bands for illustration purposes. The various beams can be selected, one MIMO pair for each node. Once powered, the MIMO system 100 can cycle through each node 110 to determine functionality then proceed to select antenna beam patterns 502, 504, 506 in each node 110 to satisfy the data/video throughput goal for basic Wi-Fi and two beams for MIMO operation (e.g., an exemplary design has six antenna ports to work with forming three regions of pattern coverage, hence in a MIMO configuration, the same special beam could be covered by two antennas. Although possible, it is not likely the preferred case due to the definition of MIMO).

Figure 11:
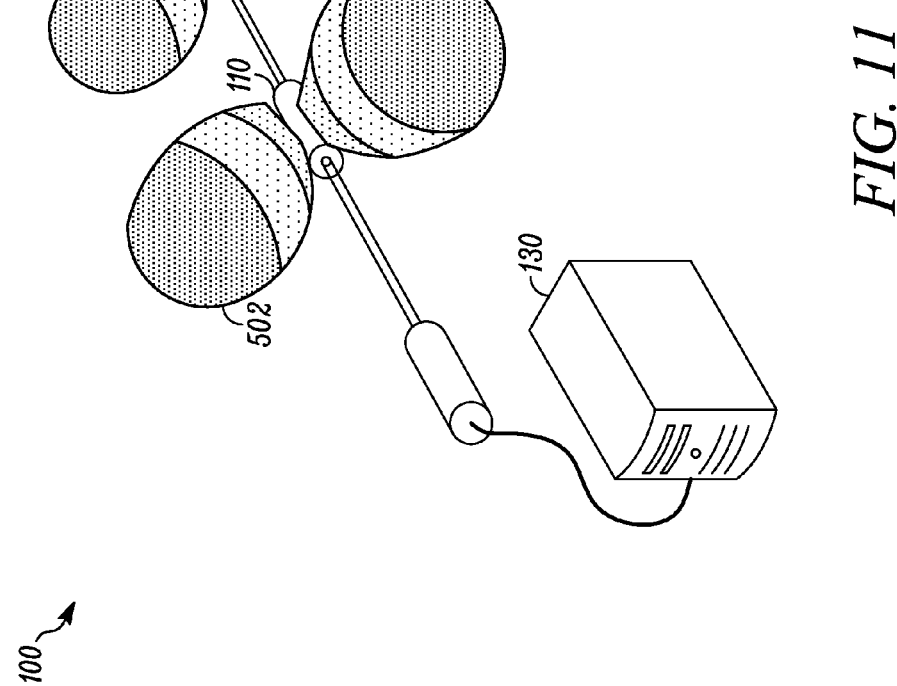
Figure 12:
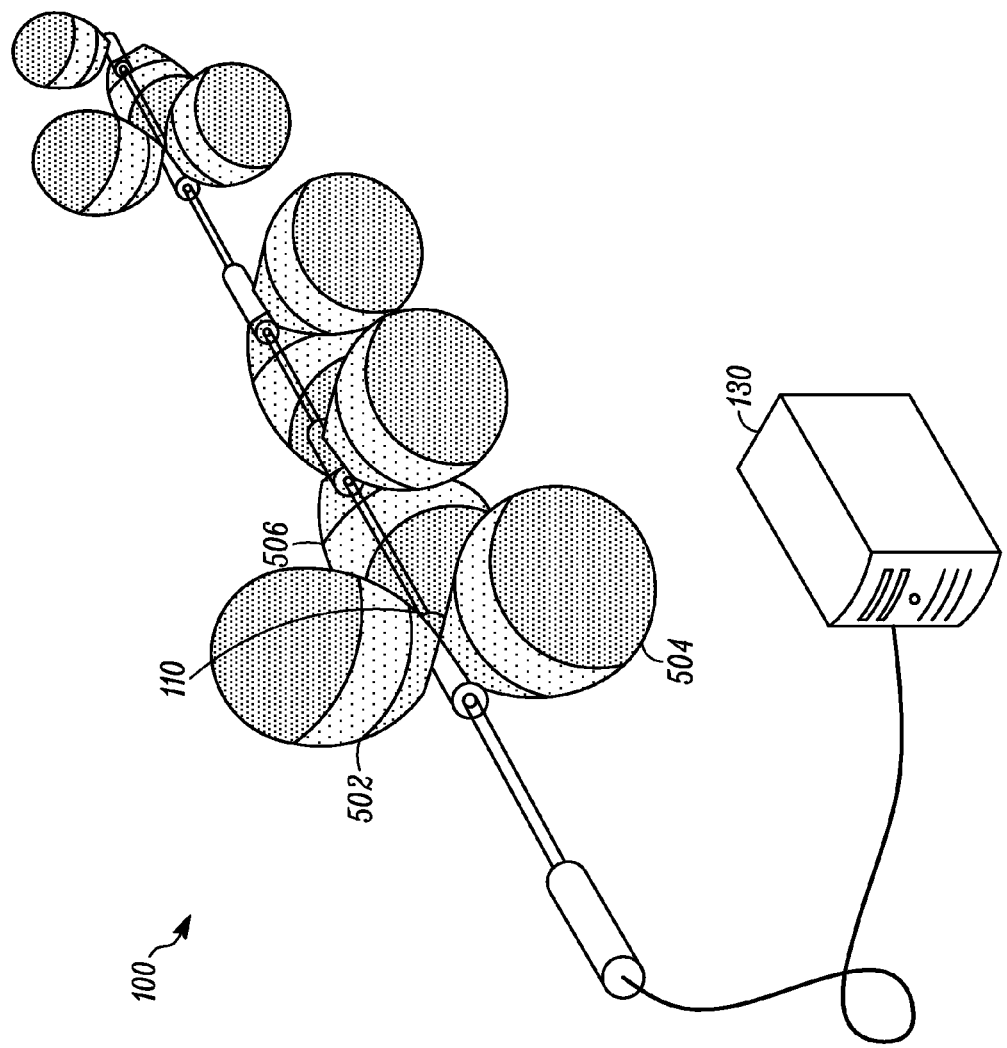
Figure 13:
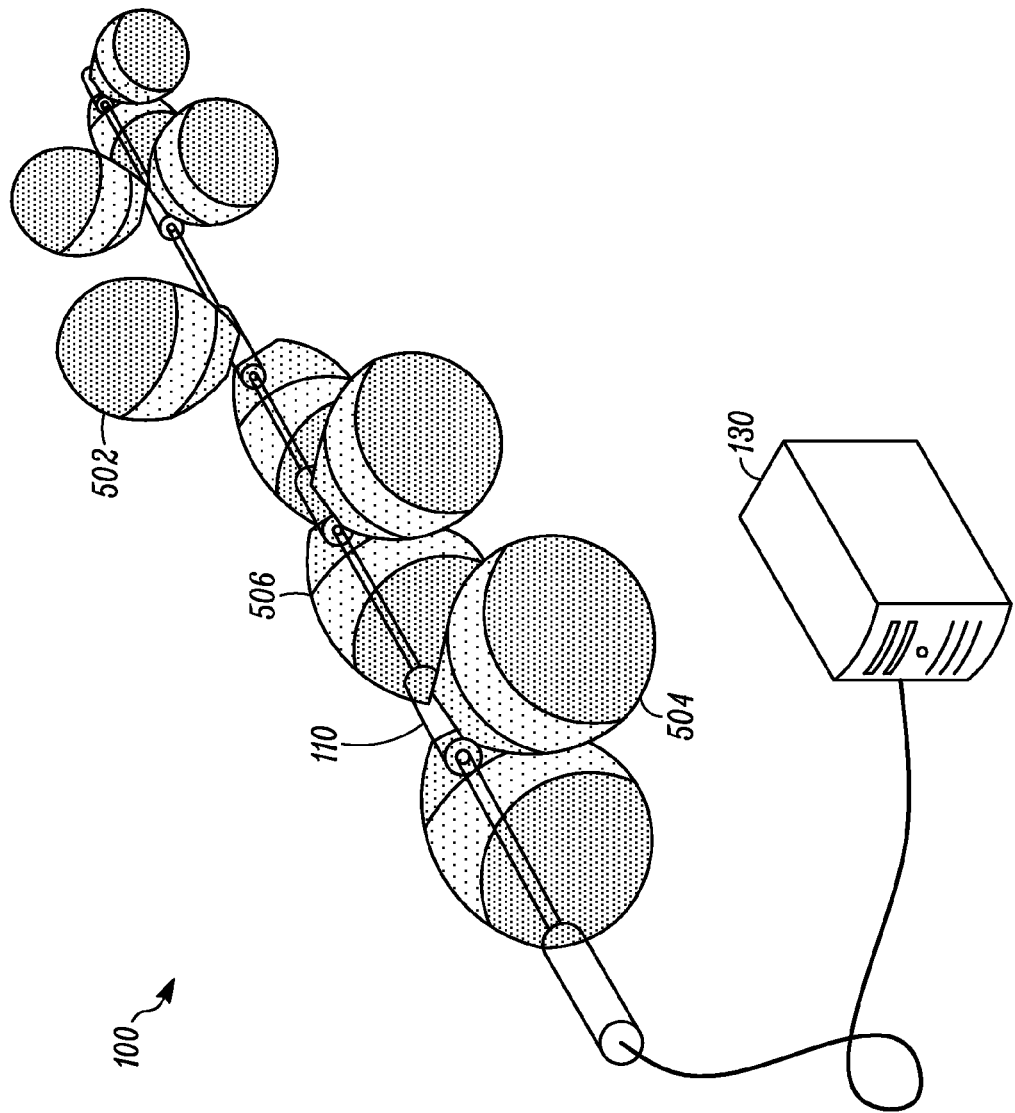

If there were no sensors, and the MIMO system 100 was assumed to be pointing up, and VSWR was equally good, then the antenna selections would look like that of FIG. 11 where all beams are pointing towards either a default position (even if the BER/VSWR are equal) for basic Wi-Fi and MIMO. This can be an issue since the test signal may or may not be in the actual area requiring coverage (such as another neighboring node). The intent of MIMO system 100 is to use neighboring cells to calibrate and select antenna configuration, but this can be an issue of the TX and RX antenna configuration has no cognition of its orientation in anticipation of illuminating an area where the user is going to be. Having orientation awareness allows for ultimately selecting a better radiation pattern allowing for a better user experience. Without orientation and just using signaling BER optimization one could realize the exemplary pattern configuration of FIG. 12.

If the orientation and context information is used, especially when neighbor BER calibration yields similar results in antenna beam selection, would migrate the selection towards the context vector (e.g., loudest audio, follow earth gravity, closest to north, south, east, west such as in a football stadium, etc.). The modified result would be that of FIG. 13 where most users get Wi-Fi coverage over that of other solutions while the system may select an equal or slightly degraded test signal favoring beam pointing orientation.

Figure 14:
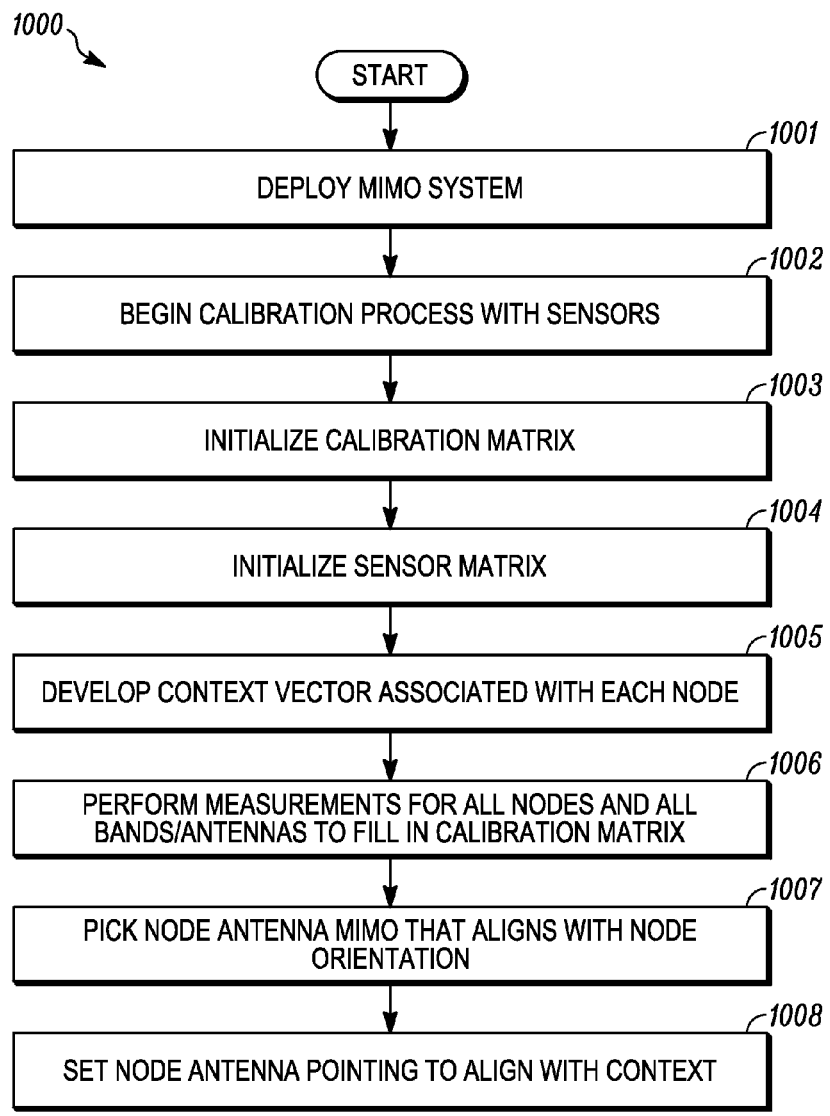
FIG. 14 is a flowchart of a method for an enhanced calibration process for the MIMO system using node context information in accordance with some embodiments.

FIG. 14 is a flowchart of a method 1000 for an enhanced calibration process for the MIMO system 100 using node context information in accordance with some embodiments. The method 1000 can be implemented by the server 130 and the nodes 110. Also, the method 1000 is similar to the method 900 with the addition of the node context information from the various sensor components in the nodes 110. The method 1000 includes initially deploying the MIMO system 100 (step 1001). Here, the MIMO system 100 is physically installed and powered up. The method 1000 includes beginning a calibration process with sensor data (step 1002). For example, the nodes 110 can provide data via the connection 120 to the server 130 from the various sensor components in each of the nodes 110. The method 1000 includes initializing a calibration matrix (step 1003). The calibration matrix forms data of all nodes, antennas, and bands of operation. The initialization determines the size of the matrix (e.g., number of nodes, antennas, bands of operation, etc.), and what tests will be performed (e.g., random data to test BER, test pattern data to test BER, etc.).

Next, the method 1000 includes initializing a sensor matrix (step 1004). The sensor matrix can be for each node 110 and can include data from the associated sensor components in that node 110. For example, the sensor matrix can include data related to sensor configurations in the node 110, reference coordinates of the node 110, antenna pattern orientation data, antenna pointing data, etc. In an exemplary embodiment, the server 130 can initialize the sensor matrix for each node 110 to determine the reference coordinates, antenna pattern orientation, an antenna pointing vector, etc. Next, the method 1000 includes developing a context vector associated with each node 110 (step 1005). This includes defining the context vector associated with each node 110 which can include altitude/pressure, temperature, time, an acceleration vector, a compass vector, an audio vector, light levels, GPS coordinates, and the like. The server 130 can send the various data to a context database lookup function and return an orientation based thereon which is a recommended context.

Next, the method 1000 includes performing measurements for all nodes and all bands/antennas to fill in measures in the calibration matrix (step 1006). This includes, at each node and each associated antenna and for each band, setting up the antennas and running tests for data measurements. For example, the tests can include BER tests or the like with random or test data or a similar performance metric. These tests can be run across all nodes 110 serially, and a result includes a measurement matrix. The method 1000 includes selecting node antennas MIMO that align with the node orientation (step 1007). Finally, the method 1000 sets the node antenna pointing to align with the context (step 1008). For example, the method 1000 can define the preferred orientation in ideal install conditions through the context vector. The method 1000 can set the pointing of the antenna based thereon, e.g. up, down, forward, backward.

The method 1000 provides beam pointing where nodes 110 are tethered and connected to the server 130 where data transfer performance can be measured from node to node as directed by the server 130. The server 130 can include a data performance program that generates a test signal for transmit in one node and receives that signal in a tethered node to determine BER or similar performance metric. The server 130 can include a data performance program that can select a node antenna for transmit and a node antenna for receive to determine BER or similar performance metric. The server 130 can include a data performance program that receives tethered node sensor information from transmit and receive node for the purposes of determining BER or similar performance metric. The server 130 can include a context vector interpreter program that utilizes receive and transmit node performance to modify, or weigh importance of, a particular performance metric to select a pointing beam based on a nodes context vector.

For all of the exemplary embodiments described herein, the context vector is built to contain the tethered nodes orientation. A subset of the context vector can contain additional sensor data not typically associated with antenna beam pointing. A context vector data base can provides information of the operational environment of the tethered nodes. The context vector referred to herein is not a simple collection of independent devices metrics/parameters but is part of a collective forming the MIMO system 100. The collective is the sum total of all metrics from each node 110 attached to the backhaul in the MIMO system 100. The context vector used is constructed by a tethered server independent from the device or node. Antenna selection can be performed by the server and not the device. Neighboring devices are used to establish context information (BER measurements, etc.) for direct result of pointing a node's antenna beam thus calibration of each device is dependent on neighboring or tethered nodes/devices.

Figure 15A:
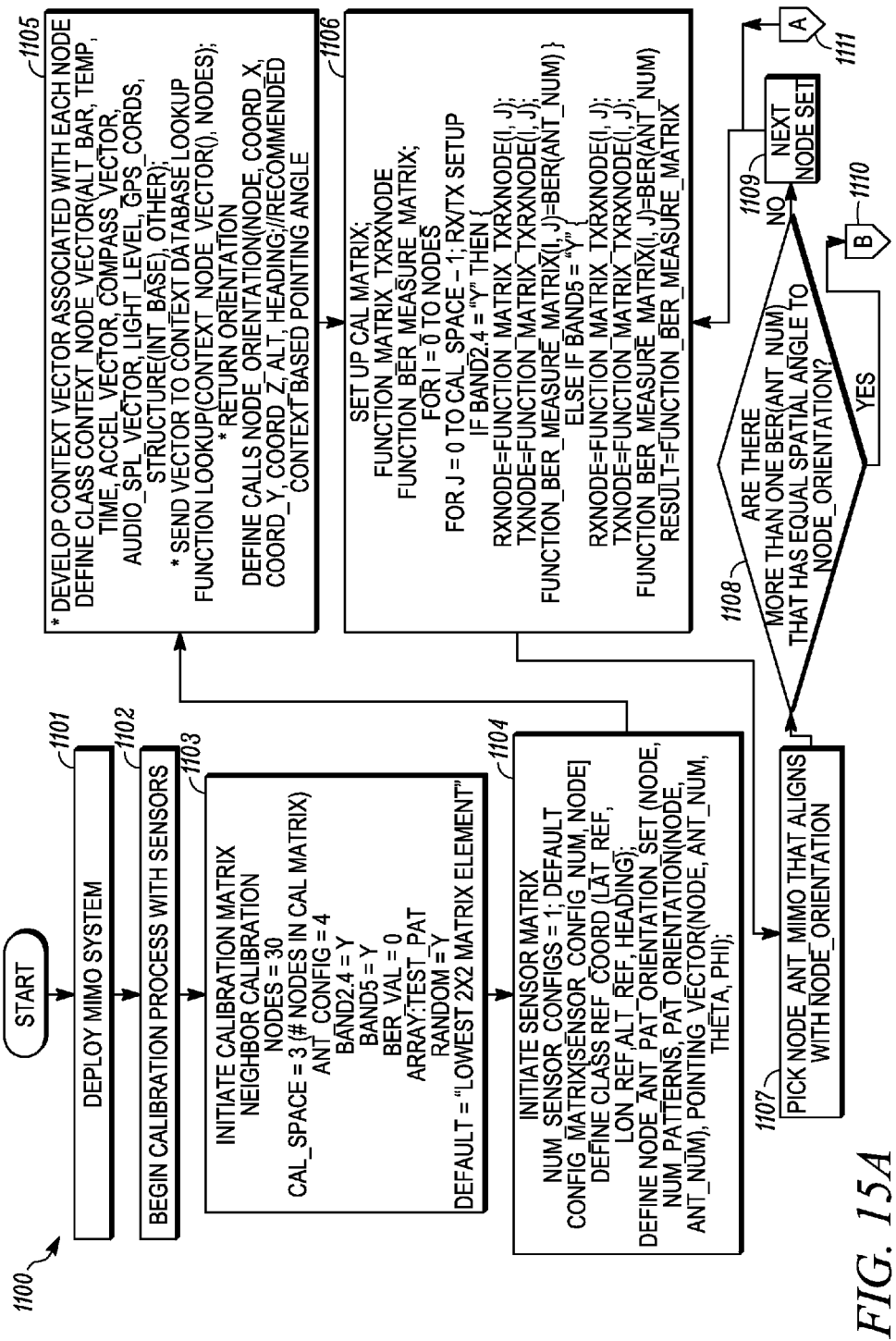
FIGS. 15A and 15B are a flowchart of an exemplary calibration method with the MIMO system in a dual-band, MIMO Wi-Fi configuration in accordance with some embodiments.
Figure 15B:
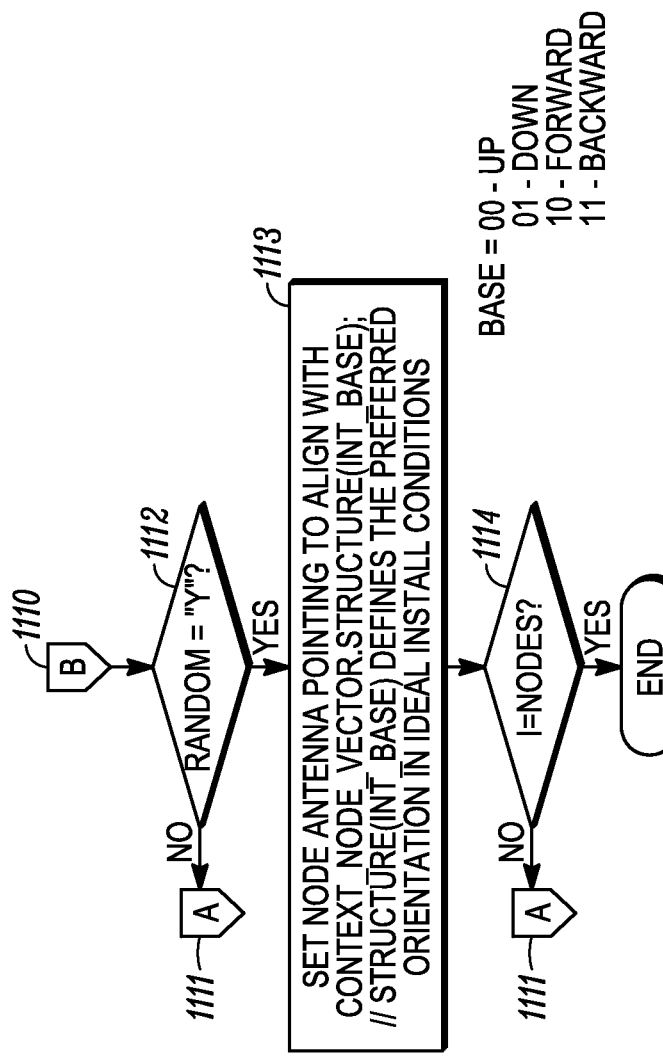

FIGS. 15A and 15B are a flowchart of an exemplary calibration method 1100 with the MIMO system 100 in a dual-band, MIMO Wi-Fi configuration in accordance with some embodiments. The calibration method 1100 can be performed by the server 130 in communication with the nodes 110. The calibration method 1100 includes deploying the MIMO system (step 1101). This includes physical installation and powering of the MIMO system 100. The calibration method 1100 includes beginning a calibration process with the sensors in the MIMO system 100 (step 1102). Here, the nodes 110 can provide sensor data to the server 130. The calibration method 1100 also includes initiating a calibration matrix (step 1103). This includes neighbor calibration in a cooperative manner. For example, the MIMO system 100 can include 30 nodes, a calibration space of 3 (i.e., the number of nodes in the calibration matrix), an antenna configuration (e.g., 4), which bands of operation (e.g., 2.4 GHz, 5 GHz, etc.), a BER value (e.g., 0), an array for a test pattern, whether it is random, etc.

Next, the calibration method 1100 includes initiating a sensor matrix (step 1104). Here, the calibration method 1100 populates the sensor matrix with data from the sensors in the nodes 110. For example, this can include a number of sensor configurations (e.g., 1), a sensor configuration matrix which includes the configuration and a node identification, etc. This can also include defining reference coordinates, Ref_coord, of a latitude reference, a longitude reference, an altitude reference, and a heading and node antenna pattern orientations, Node_Ant_Pat_Orientation_set, including the identifying node, the number of patterns for the node (num_Patterns), the pattern orientation (Pat_Orientation(node, ant_num)), and a pointing vector (pointing_vector(node, ant_num, theta, phi)).

Next, the calibration method 1100 includes developing a context vector associated with each node (step 1105). This includes first developing a context node vector, Context_Node_Vector, which can include altitude/pressure (Alt_Bar), temperature (Temp), time (Time), acceleration data (Accel_Vector), compass data (Compass_Vector), audio data (Audio_SPL_Vector), light sensor data (Light_Level), GPS coordinates (GPS_cords), etc. The calibration method 1100 can send the context node vector to a context database lookup which returns the appropriate orientation based on the data in the context node vector. From this, a defined node orientation can be devised, Node Orientation(Node, Coord_x, Coord_y, Coord_z, Alt, Heading, which is the recommended Context based pointing angle.

Next, the calibration method 1100 sets up a calibration matrix (step 1106). Here, the server 130 can select individual nodes 110 and individual antennas at the nodes 110 to run tests and configurations. For example, this step can include two functions—to select a node 110 (Function_matrix_TXRXnode) and to perform a test such as a BER measurement (Function_BER_measure_matrix). The BER measurement can use proximate nodes 110 to receive test data and perform measurements. This step cycles through all of the nodes (For i=0 to Nodes, For j=0 to Cal_Space−1) as well as through all of the bands (If Band2.4="Y" then {Rxnode=Function_matrix_TXRXnode(i, j); Txnode=Function_matrix_TXRXnode(i,j); Function_BER_measure_matrix(i, j)=BER(ant_num)} Else if Band5="Y" {Rxnode=Function_matrix_TXRXnode(i, j); Txnode=Function_matrix_TXRXnode(i,j); Function_BER_measure_matrix(i, j)=BER(ant_num)). The result here is a BER measurement matrix (Result=Function_BER_measure_matrix).

With the BER measurement, the calibration method 1100 picks a node antenna (Node_Ant_MIMO) that aligns with the node orientation (Node_Orientation) (step 1107). If there is not more than one BER for the antennas (BER(ant_num) that has equal spatial angles to the node orientation (step 1108), the calibration method 1100 performs the next node set (step 1109). If so (step 1108), the calibration method 1100 moves to FIG. 15B (step 1110), if the settings for the calibration method 1100 random (step 1112), the calibration method 1100 returns to the next node set (step 1109). If not, the calibration method 1100 sets the node antenna pointing to align with the context node vector (Context_Node_Vector.Structure(int_base)) (step 1113). This defines the preferred orientation in ideal install conditions. If there are more nodes (step 1114), the calibration method 1100 returns to the next node set (step 1109), else the calibration method 1100 ends.

Figure 16:
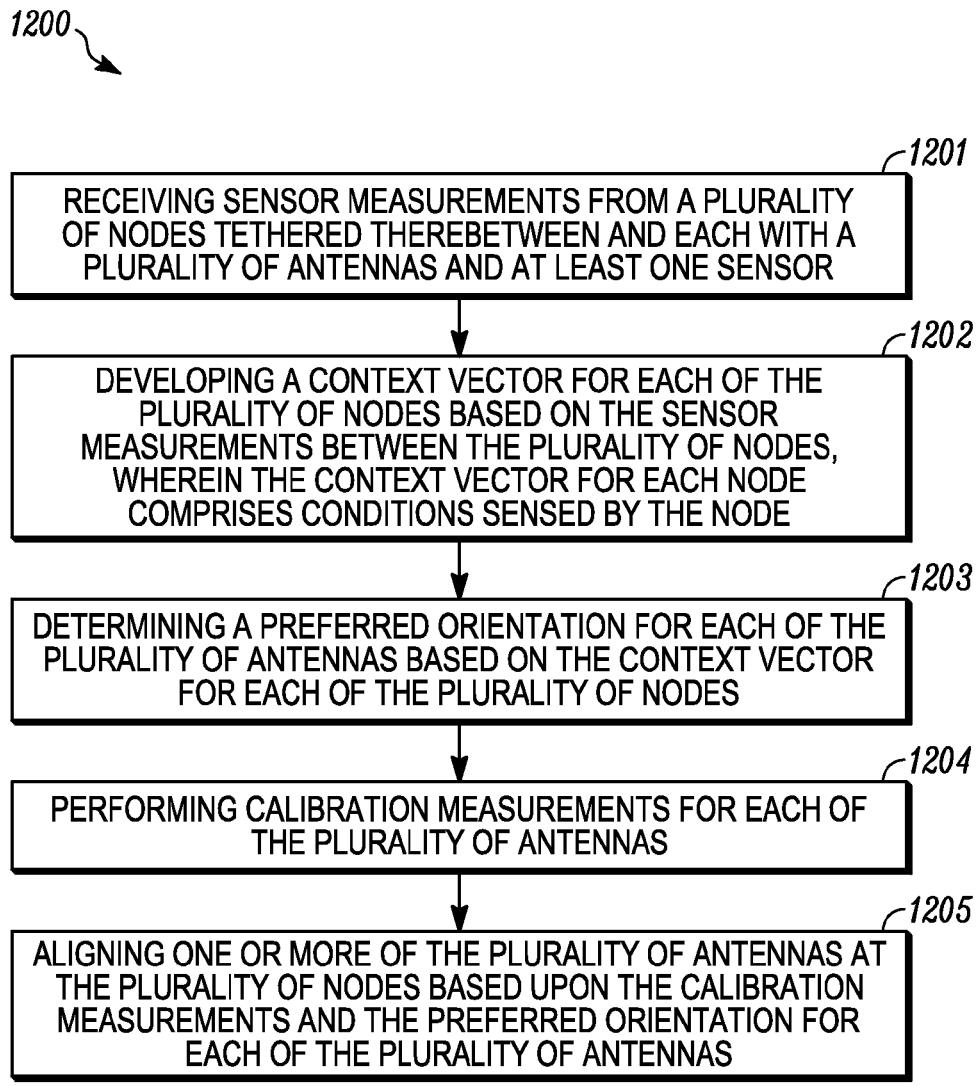
FIG. 16 is a flowchart of a method using a Context Aware MIMO Wi-Fi antenna subsystem for optimized data TX/RX in a dynamic deployment configuration in accordance with some embodiments.

FIG. 16 is a flowchart of a method 1200 using a Context Aware MIMO Wi-Fi antenna subsystem for optimized data TX/RX in a dynamic deployment configuration in accordance with some embodiments. The method 1200 can be implemented in the MIMO system 100 such as in the server 130 and/or the nodes 110. The method 1200 includes receiving sensor measurements from a plurality of nodes tethered therebetween and each with a plurality of antennas and at least one sensor (step 1201). Here, the method 1200 receives sensors measurements from at least one sensor such as described in FIG. 4. The method 1200 includes developing a context vector for each of the plurality of nodes based on the sensor measurements between the plurality of nodes, wherein the context vector for each node comprises conditions sensed by the node (step 1202). Again, the method 1200 uses the sensor measurements to develop context for the nodes at the time of the sensor measurements.

The method 1200 includes determining a preferred orientation for each of the plurality of antennas based on the context vector for each of the plurality of nodes (step 1203). Here, the method 1200 determines a preferred orientation for the antennas of the nodes based on the current context. That is, the method 1200 utilizes more than simple spatial orientation to determine the preferred orientation. Rather, the method 1200 uses sensor measurements providing the current context at or near the node to determine the preferred orientation. This context can be anything measurable by sensors, e.g. light, sound, humidity, temperature, number of proximate people, etc.

The method 1200 includes performing calibration measurements for each of the plurality of antennas (step 1204). The calibration measurements can be BER testing in conjunction with neighboring nodes as well as other techniques. The method 1200 includes aligning one or more of the plurality of antennas at the plurality of nodes based upon the calibration measurements and the preferred orientation for each of the plurality of antennas (step 1205). Again, the method 1200 provides alignment of the antennas at the nodes based on context in addition to spatial orientation. The context provides additional constraints on the alignment that are not found by the spatial orientation. This can also include turning off antennas which sense little or no activity as well as pointing towards the expected source of activity.

In the method 1200, each of the plurality of nodes can include a Wi-Fi access point and the plurality of antennas comprise a plurality of multiple-input and multiple-output. Optionally, the plurality of multiple-input and multiple-output (MIMO) antennas can operate in dual bands. The method 1200 can further include performing the calibration measurements as bit error rate measurements responsive to test signals between two nodes of the plurality of nodes. The method 1200 can further periodically performing the receiving, the developing, the determining, the performing, and the aligning. Here, the context can be updated and alignment modified based thereon. The method 1200 can further include selecting antennas of the plurality of antennas at each of the plurality of nodes that satisfy throughput goals of Wi-Fi based on the calibration measurements and the preferred orientation; and turning off non-selected antennas at each of the plurality of nodes. Again, this can provide a "green" solution taking context into effect.

The method 1200 can further include periodically performing the receiving, the developing, the determining, the performing, the aligning, the selecting, and the turning off. The method 1200 can further include deploying a system comprising the plurality of nodes and a server communicatively coupled to the plurality of nodes. In the method 1200, the at least one sensor can include one of a compass, an accelerometer, and a barometer. Also, in the method 1200, the at least one sensor can include any of the compass, the accelerometer, the barometer, a light sensor, a microphone, a humidity sensor, and a global positioning system (GPS).

Additionally, the MIMO system 100 and the server 130 can implement the method 1200. For example, the MIMO system 100 can be a server and a plurality of nodes tethered therebetween in a non-linear configuration and each comprising a plurality of antennas and at least one sensor with the server and the plurality of nodes are configured to perform the steps of the method 1200.

Figure 17:
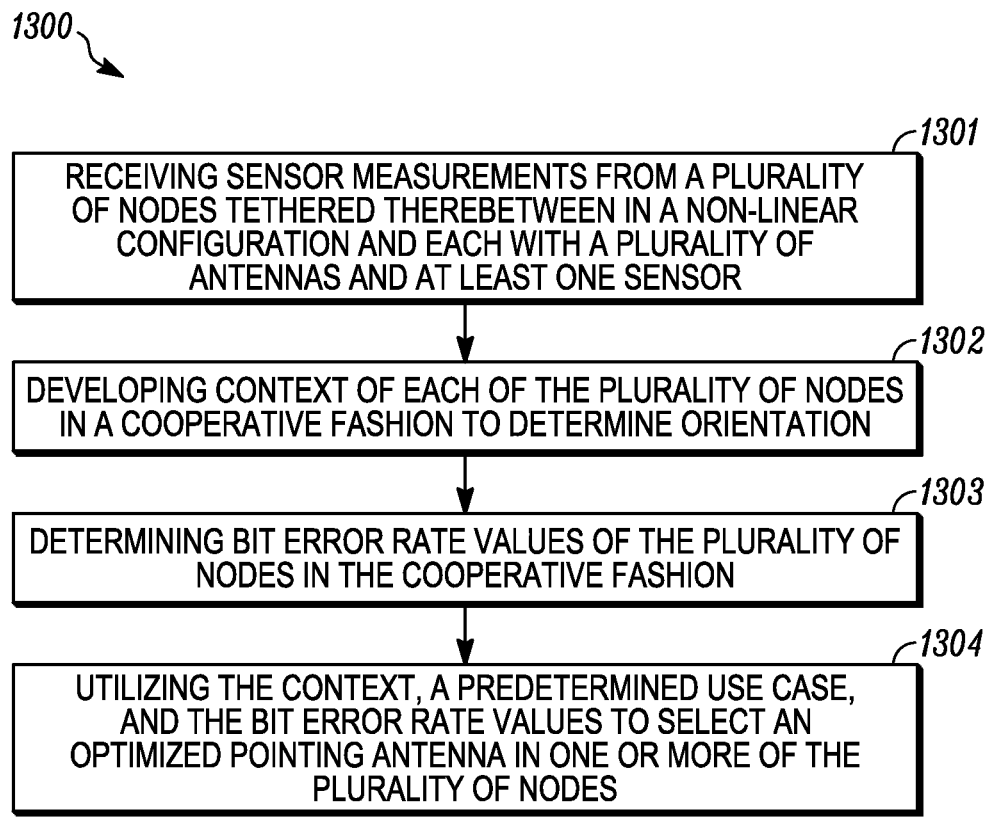
FIG. 17 is a flowchart of a method for modifying antenna pointing during calibration in a conformal deployment application using node context Information in accordance with some embodiments.

FIG. 17 is a flowchart of a method 1300 for modifying antenna pointing during calibration in a conformal deployment application using node context Information in accordance with some embodiments. The method 1300 can be implemented in the MIMO system 100 such as in the server 130 and/or the nodes 110. The method 1300 includes receiving sensor measurements from a plurality of nodes tethered therebetween in a non-linear configuration and each with a plurality of antennas and at least one sensor (step 1301). The non-linear configuration includes a random configuration where the tethered nodes are in any relationship to one another such as illustrated in FIG. 2. Here, the method 1300 receives sensors measurements from at least one sensor such as described in FIG. 4.

The method 1300 includes developing context of each of the plurality of nodes in a cooperative fashion to determine orientation (step 1302). Again, the method 1300 uses the sensor measurements to develop context for the nodes at the time of the sensor measurements. Again, the context is more than simple spatial orientation of the node and antennas. Rather, the method 1300 uses sensor measurements providing the current context at or near the node for selections. This context can be anything measurable by sensors, e.g. light, sound, humidity, temperature, number of proximate people, etc.

The method 1300 includes determining bit error rate values of the plurality of nodes in the cooperative fashion (step 1303). The cooperative fashion includes neighboring nodes performing tests on other nodes. The method 1300 includes utilizing the context, a predetermined use case, and the bit error rate values to select an optimized pointing antenna in one or more of the plurality of nodes (step 1304). Again, the optimized pointing antenna is selected herein based on context in addition to spatial orientation while considering other nodes/antennas, i.e. the cooperative fashion.

In the method 1300, each of the plurality of nodes can include a Wi-Fi access point and the plurality of antennas comprise a plurality of multiple-input and multiple-output. Optionally, the plurality of multiple-input and multiple-output (MIMO) antennas can operate in dual bands. The method 1300 can further include determining an orientation vector for each of the plurality of nodes based on the sensor measurements; and determining a desired node antenna pointing vector for each of the plurality of nodes based on the orientation vector and a node use case vector based on the predetermined use case. The method 1300 determining a node directivity vector for each of the plurality of nodes based on a node range vector and the orientation vector; and selecting antennas of the plurality of antennas based on the node directivity vector.

In the method 1300, the at least one sensor can include one of a compass, an accelerometer, and a barometer. Also, in the method 1300, the at least one sensor can include any of the compass, the accelerometer, the barometer, a light sensor, a microphone, a humidity sensor, and a global positioning system (GPS).

Additionally, the MIMO system 100 and the server 130 can implement the method 1300. For example, the MIMO system 100 can be a server and a plurality of nodes tethered therebetween in a non-linear configuration and each comprising a plurality of antennas and at least one sensor with the server and the plurality of nodes are configured to perform the steps of the method 1300.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, comprising:
   receiving sensor measurements from a plurality of nodes tethered therebetween in a non-linear configuration and each with a plurality of antennas and at least one sensor;
   developing context of each of the plurality of nodes in a cooperative fashion to determine orientation;
   determining bit error rate values of the plurality of nodes in the cooperative fashion;
   utilizing the context, a predetermined use case, and the bit error rate values to select an optimized pointing antenna in one or more of the plurality of nodes.

2. The method of claim 1, wherein each of the plurality of nodes comprises a Wi-Fi access point and the plurality of antennas comprise a plurality of multiple-input and multiple-output.

3. The method of claim 2, wherein the plurality of multiple-input and multiple-output (MIMO) antennas operate in dual bands.

4. The method of claim 1, further comprising:
   determining an orientation vector for each of the plurality of nodes based on the sensor measurements; and
   determining a desired node antenna pointing vector for each of the plurality of nodes based on the orientation vector and a node use case vector based on the predetermined use case.

5. The method of claim 4, further comprising:
   determining a node directivity vector for each of the plurality of nodes based on a node range vector and the orientation vector; and
   selecting antennas of the plurality of antennas based on the node directivity vector.

6. The method of claim 1, wherein the at least one sensor comprises one of a compass, an accelerometer, and a barometer.

7. The method of claim 6, wherein the at least one sensor comprises any of the compass, the accelerometer, the barometer, a light sensor, a microphone, a humidity sensor, and a global positioning system (GPS).

8. A system, comprising:
   a server;
   a plurality of nodes tethered therebetween in a non-linear configuration and each comprising a plurality of antennas and at least one sensor;
   wherein the server and the plurality of nodes are configured to perform the steps of:
      receiving sensor measurements from the plurality of nodes at the server;
      developing context of each of the plurality of nodes in a cooperative fashion to determine orientation;
      determining bit error rate values of the plurality of nodes in the cooperative fashion;
      utilizing the context, a predetermined use case, and the bit error rate values to select an optimized pointing antenna in one or more of the plurality of nodes.

9. The system of claim 8, wherein each of the plurality of nodes comprises a Wi-Fi access point and the plurality of antennas comprise a plurality of multiple-input and multiple-output.

10. The system of claim 9, wherein the plurality of multiple-input and multiple-output (MIMO) antennas operate in dual bands.

11. The system of claim 8, wherein the server and the plurality of nodes are configured to perform the steps of:
    determining an orientation vector for each of the plurality of nodes based on the sensor measurements; and
    determining a desired node antenna pointing vector for each of the plurality of nodes based on the orientation vector and a node use case vector based on the predetermined use case.

12. The system of claim 11, wherein the server and the plurality of nodes are configured to perform the steps of:
    determining a node directivity vector for each of the plurality of nodes based on a node range vector and the orientation vector; and
    selecting antennas of the plurality of antennas based on the node directivity vector.

13. The system of claim 8, wherein the at least one sensor comprises one of a compass, an accelerometer, and a barometer.

14. The system of claim 13, wherein the at least one sensor comprises any of the compass, the accelerometer, the barometer, a light sensor, a microphone, a humidity sensor, and a global positioning system (GPS).

15. A server, comprising:
    a network interface communicatively coupled to a plurality of tethered nodes in a non-linear configuration, each of the tethered nodes comprising a plurality of antennas and at least one sensor;
    a processor; and
    memory storing instructions that, when executed, cause the processor to perform the steps of:
       receiving sensor measurements from the plurality of nodes;
       developing context of each of the plurality of nodes in a cooperative fashion to determine orientation;
       receiving bit error rate values of the plurality of nodes in the cooperative fashion;
       utilizing the context, a predetermined use case, and the bit error rate values to select an optimized pointing antenna in one or more of the plurality of nodes.

16. The server of claim 15, wherein each of the plurality of nodes comprises a Wi-Fi access point and the plurality of antennas comprise a plurality of multiple-input and multiple-output.

17. The server of claim 16, wherein the plurality of multiple-input and multiple-output (MIMO) antennas operate in dual bands.

18. The server of claim 15, wherein the instructions that, when executed, further cause the processor to perform the steps of:
    determining an orientation vector for each of the plurality of nodes based on the sensor measurements; and
    determining a desired node antenna pointing vector for each of the plurality of nodes based on the orientation vector and a node use case vector based on the predetermined use case.

19. The server of claim 18, wherein the instructions that, when executed, further cause the processor to perform the steps of:
    determining a node directivity vector for each of the plurality of nodes based on a node range vector and the orientation vector; and
    selecting antennas of the plurality of antennas based on the node directivity vector.

20. The server of claim 15, wherein the at least one sensor comprises any of the compass, the accelerometer, the barometer, a light sensor, a microphone, a humidity sensor, and a global positioning system (GPS).

* * * * *